United States Patent
Ladetto et al.

(10) Patent No.: US 7,421,340 B2
(45) Date of Patent: Sep. 2, 2008

(54) METHOD, APPARATUS AND COMPUTER PROGRAM FOR AZIMUTH DETERMINATION E.G. FOR AUTONOMOUS NAVIGATION APPLICATIONS

(75) Inventors: Quentin Ladetto, Heerbrugg (CH); Celine Vanderstraeten, Sargans (CH)

(73) Assignee: Vectronix AG, Heerbrugg (CH)

( * ) Notice: Subject to any disclaimer, the term of this patent is extended or adjusted under 35 U.S.C. 154(b) by 447 days.

(21) Appl. No.: 11/067,665

(22) Filed: Feb. 28, 2005

(65) Prior Publication Data
US 2006/0195254 A1    Aug. 31, 2006

(51) Int. Cl.
*G01C 21/00*    (2006.01)

(52) U.S. Cl. ........................ 701/207; 701/216; 701/217; 342/357.14; 73/1.77

(58) Field of Classification Search ................. 701/200, 701/207, 213, 216, 217, 224; 340/944; 73/1.76, 73/1.77; 342/357.14
See application file for complete search history.

(56) References Cited

U.S. PATENT DOCUMENTS

| | | | |
|---|---|---|---|
| 4,143,467 A * | 3/1979 | Erspamer et al. ............... | 33/356 |
| 4,593,359 A * | 6/1986 | Sadeh ........................ | 701/200 |
| 5,151,862 A | 9/1992 | Nakayama et al. | |
| 5,485,385 A * | 1/1996 | Mitsugi ...................... | 701/214 |
| 6,522,266 B1 | 2/2003 | Soehren et al. | |
| 6,826,477 B2 * | 11/2004 | Ladetto et al. .............. | 701/217 |
| 6,842,991 B2 | 1/2005 | Levi et al. | |

FOREIGN PATENT DOCUMENTS

JP      363109317 A   *   5/1998

\* cited by examiner

*Primary Examiner*—Gertrude A. Jeanglaude
(74) *Attorney, Agent, or Firm*—Oliff & Berridge, PLC

(57) ABSTRACT

For an observer equipped with a first azimuth data source responsive to a magnetic field to deliver first azimuth data, such as a compass, and with a second azimuth data source delivering second azimuth data and which is independent of magnetic fields, such as a gyroscope. The azimuth is determined by:
    analyzing the first and second azimuth data to determine whether a magnetic disturbance is present, and
    determining azimuth selectively on the basis of: the first azimuth data, the second azimuth data, or a combination of the first and second azimuth data, as a function of the result of the comparing step.

In an embodiment, the choices of azimuth data source and events such as magnetic disturbances, sensor updates, types of trajectory deduced, are stored as a history sequence over successive time windows, by analogy with a DNA sequence, and is exploited for optimizing azimuth or navigation results.

90 Claims, 10 Drawing Sheets
(8 of 10 Drawing Sheet(s) Filed in Color)

US 7,421,340 B2

METHOD, APPARATUS AND COMPUTER PROGRAM FOR AZIMUTH DETERMINATION E.G. FOR AUTONOMOUS NAVIGATION APPLICATIONS

BACKGROUND OF THE INVENTION

1. Field of the Invention

The present invention relates to the field of azimuth determination, with applications e.g. in the field of pedestrian or vehicle autonomous navigation. More particularly, the invention provides a method, apparatus and computer program which optimizes the accuracy obtained from sources of raw azimuth data.

2. Prior Art

An accurate and reliable determination of azimuth is important notably in navigation, surveying and civil engineering. Known techniques rely on external signal sources to acquire azimuth data, such as in GPS navigation systems, or in systems which receive signals from land-based radio beacons. However, the reliance on being able to receive the necessary external signals exclude these techniques where the observer is susceptible of being in poor or impossible reception conditions, such as indoors, in densely urbanized or forested environments, or under a low cloud ceiling in the case of a GPS receiver.

It is then necessary to use autonomous, or dead reckoning, azimuth determination techniques. Typically these involve the use of a magnetic compass or a gyroscope.

A magnetic compass indicates the direction of alignment of the Earth's magnetic flux lines, which join at the magnetic North. Modern magnetic compasses use semiconductor magnetic sensors based on the Hall effect, and can produce an output in electronic form. A magnetic compass responds simply to ambient magnetic field lines, which may have other components than the Earth's magnetic field. These spurious components can be magnetic fields from nearby man-made sources, such as transformer stations, transmission lines, electric motors, etc., or from natural conditions, such as iron ores, magnetic storms, etc. They produce errors in the compass reading which cannot be easily detected or corrected, with an attendant loss of azimuth accuracy that is incompatible with many applications. Also, the Earth's magnetic field lines can themselves be distorted, e.g. by metallic structures, features of the local geophysical environment, etc.

A gyroscope uses the gyroscopic or rotational effect of a rotating or vibrating mass to maintain a pre-programmed reference azimuth. Small navigation systems typically use a portable gyroscope in the form of a combined mechanical and electronic unit comprising two or three orthogonal reference azimuth axes from respective gyroscopes. The absolute reference azimuth is maintained in alignment during the gyroscope's displacement, and is unaffected by spurious magnetic fields. However, it is subject to a systematic error as a function of time, referred to as drift, which calls for frequent reprogramming cycles of the reference azimuth, or the gyroscope bias.

SUMMARY OF THE INVENTION WITH OBJECTS

In view of the foregoing, the present invention has for object a method and apparatus for azimuth detection that implement an algorithm for optimizing the accuracy of acquired azimuth data.

More particularly, according to a first aspect, the invention relates to a method of determining an azimuth using a first azimuth data source responsive to a magnetic field to deliver first azimuth data, and a second azimuth data source delivering second azimuth data independent of magnetic field, comprising the steps of:

analyzing the first and second azimuth data to determine whether a magnetic disturbance is present, and determining the azimuth selectively on the basis of: the first azimuth data, the second azimuth data, or a combination of the first and second azimuth data, as a function of the result of the analyzing step.

Optional aspects of the first object, which can be considered separately or in combination, are presented as follows.

The analyzing step may comprise the sub-steps of:

acquiring the first and second azimuth data, comparing the first and second azimuth data, and identifying a magnetic field disturbance on the basis of the comparison, and wherein the azimuth determining step comprises basing the determined azimuth on one of:

i) the second azimuth data alone, or ii) a combination of the second azimuth data and the first azimuth data, when a magnetic disturbance is identified.

The analyzing step may comprise the sub-steps of:

acquiring the first and second azimuth data over a plurality of sampling periods within a time window, performing a statistical analysis on the first and second azimuth data for the sampling periods, and identifying a magnetic field disturbance on the basis of the statistical analysis, and wherein the azimuth determining step comprises basing the determined azimuth on one of:

i) the second azimuth data alone, or ii) a combination of the second azimuth data and the first azimuth data, when a magnetic disturbance is identified.

The analyzing step may comprise the sub-steps of:

acquiring the first and second azimuth data over a plurality of sampling periods within a time window, determining the normal standard deviation of the first azimuth data and the normal standard deviation of the second azimuth data for the sampling periods, determining the ratio of the normal standard deviation of the first azimuth data to the normal standard deviation of the second azimuth data for the sampling periods, comparing the ratio to a determined threshold value, and identifying a magnetic field disturbance when the ratio crosses the determined threshold, wherein the azimuth determining step comprises basing the determined azimuth on one of:

i) the second azimuth data alone, or ii) a combination of the second azimuth data and the first azimuth data, when a magnetic disturbance is identified.

The method may further comprise the step of determining a change of azimuth on the basis of the second azimuth data.

The analyzing step may comprise the sub-steps of:

acquiring the first and second azimuth data over a plurality of sampling periods within a determined time window, for a succession of time windows, performing an analysis on first and second azimuth data for the sampling periods of at least a current time window and its preceding time window, taking at least one of the following actions on the basis of the analysis:

i) using only the first azimuth data of a current window to determine the azimuth, ii) using only the second azimuth data of a current window to determine the azimuth, iii) using a combination of the first azimuth data and the second azimuth of a current time window to determine the azimuth, iv) identifying a type path currently followed, and v) updating at least one parameter of the second azimuth data source.

The analyzing step may comprise the sub-steps of:

acquiring the first and second azimuth data for a succession of time windows, for at least some time windows of the succession, recording events occurring within a time window, to obtain a sequence history of azimuth events over successive time windows, and using the sequence history as input to optimize the determination of the azimuth or a position and/or a trajectory.

The analyzing step may comprise the sub-steps of:

acquiring the first and second azimuth data for a succession of time windows, for at least some time windows of the succession, recording events occurring within a time window, the events comprising at least one of:

i) choice of source(s) of azimuth data used for determining azimuth data, ii) sensor update or recalibration, iii) identified trajectory type, iv) presence of a magnetic field disturbance, to obtain a sequence history of azimuth events over successive time windows, and using the sequence history as input to optimize the determination of the azimuth or a position and/or a trajectory.

The analyzing step may comprise acquiring the first and second azimuth data over a plurality of sampling periods within a determined time window, and performing the acquisition for a succession of time windows.

The analyzing step further may further comprise the steps of:

acquiring the first and second azimuth data over a plurality of sampling periods within a time window, analyzing the first and second azimuth data of that time window, on the basis of the analysis, performing at least one of:

i) updating or recomputing at least one azimuth data of the time window, and ii) updating or recomputing a present real-time azimuth.

The analyzing step may comprise the sub-steps of:

acquiring the first and second azimuth data over a plurality of sampling periods within a time window, determining a position on the basis of the data, analyzing the first and second azimuth data of that time window, on the basis of the analyzing step, performing at least one of:

i) recomputing at least one determined position in the time window, and ii) updating or recomputing a present real-time position.

The method may comprise the steps of:

determining, on the basis of the analyzing step, a first condition in which no substantial magnetic field is present, enabling an update of the second azimuth data source, on the basis of the first azimuth data from the first azimuth data source, only if the first condition is satisfied.

The method may further comprise the steps of:

determining a current trajectory in terms of an amount of change in azimuth, using the determined current trajectory as a parameter for commanding a management of the first and/or second azimuth data source(s) and/or as a parameter for the analyzing step and/or the determining step.

The method may comprise the steps of:

determining a current trajectory of in terms of an amount of change in azimuth, identifying a current trajectory following a specific change of direction, notably a 90° or 180° change of direction, using the identified specific change of direction as a parameter for commanding a management of the first and/or second azimuth data source(s) and/or as a parameter for the analyzing step and/or the determining step.

The method may further comprise the steps of:

determining a current trajectory in terms of an amount of change in azimuth, identifying a current trajectory following a substantially straight line direction, corresponding to substantially no change in azimuth using the identified substantially straight line direction as a parameter for commanding a management of the first and/or second azimuth data source(s) and/or as a parameter for the analyzing step and/or the determining step.

The method may comprise the steps of:

performing the azimuth determination over at least two successive determined time windows, for each successive time window, determining whether a trajectory follows a substantially straight line direction, determining whether a trajectory for a current time window and for a previous time window both follow a substantially straight line direction, in the affirmative, using trajectory data of the previous window and the current window to establish a continuity relation in which the trajectory is considered to follow a same substantially straight line.

The method may further comprise the steps of:

determining a current trajectory of the observer in terms of an amount of change in azimuth, identifying a current trajectory following an predetermined amount of curve or rotation, notably an amount substantially equal to 90° or 180°, using the identified amount a curve or rotation as a parameter for commanding a management of the first and/or second azimuth data source(s) and/or as a parameter for the analyzing step and/or the determining step.

The first azimuth data source may comprise at least one magnetic compass.

The second azimuth data source may comprise at least one gyroscope.

The second azimuth data source may comprise an azimuth data source that is subject to drift error over time and is updatable with at least one operating parameter value.

The second azimuth data source may comprise at least one gyroscope, the gyroscope being updatable with at least one of:

a gyroscope scale factor, a gyroscope azimuth reference, a gyroscope bias.

The method may comprise the step of using the determined azimuth as a source of azimuth data for autonomous navigation.

The first and second azimuth data sources can be carried by a human pedestrian.

At least one of the first and second azimuth data sources may be mounted substantially at a waist position or at the upper part of the body, or a trunk portion of the body of a pedestrian.

The first and second azimuth data sources can be aboard a vehicle.

The method may comprise the steps of:
producing a history sequence of past events up to a current time, history sequence expressing at least a magnetic field characteristic determined over a respective time window, the magnetic field characteristic being classed as one of:
i) a magnetically stable environment,
ii) a magnetically disturbed environment,
iii) a potentially magnetically disturbed environment, and wherein the azimuth determining step comprises using at least one determined magnetic field characteristic as a parameter to determine azimuth.

The method may comprise the steps of:
producing a history sequence of past events up to a current time, the history sequence expressing at least an azimuth or trajectory characteristic determined over a respective time window, the azimuth or trajectory characteristic being classed as one of:
i) a displacement substantially along a straight line,
ii) a displacement along a curve with a significant substantial continuous change in azimuth,
iii) a general situation not corresponding to listed second situations i) or ii), and wherein the determining step comprises using at least one determined azimuth or trajectory characteristic as a parameter to determine the azimuth.

The method may be performed in real time to produce a substantially real-time azimuth determination.

According to a second aspect, the invention relates to a method of autonomous navigation comprising the steps of:
providing a first azimuth data source responsive to a magnetic field to deliver first azimuth data,
a second azimuth data source whose output is substantially uninfluenced by magnetic fields to deliver second azimuth data,
analyzing the first and second azimuth data to determine whether a magnetic disturbance is present,
producing an azimuth determination on the basis of the analyzing step; and
producing navigation information on the basis of the azimuth determination.

According to a third aspect, the invention relates to a method of determining an azimuth in a navigation application, comprising the steps of:
acquiring first azimuth data from magnetic compass means,
acquiring second azimuth data from gyroscope means,
using the first and second azimuth data to detect a presence of a magnetic disturbance,
when a magnetic disturbance is detected, determining the azimuth from one of:
i) a combination the first and second azimuth data, or
ii) the second azimuth alone, and
calibrating or updating an azimuth reference and/or a bias and/or a scale factor of the gyroscope means using the first azimuth data when substantially no magnetic disturbance is detected.

According to a fourth aspect, the invention relates to an apparatus for determining an azimuth, the apparatus comprising:
a first azimuth data source responsive to a magnetic field to deliver first azimuth data,
a second azimuth data source delivering second azimuth data independent of magnetic field,
means for analyzing the first and second azimuth data to determine whether a magnetic disturbance is present, and
means for determining the azimuth selectively on the basis of: the first azimuth data, the second azimuth data, or a combination of the first and second azimuth data as a function of a result of an analysis by the analyzing means.

According to a fifth aspect, the invention relates to an autonomous navigation apparatus comprising:
a first azimuth data source responsive to a magnetic field to deliver first azimuth data,
a second azimuth data source, whose output is substantially uninfluenced by magnetic fields, delivering second azimuth data,
means for analyzing the first and second azimuth data to determine whether a magnetic disturbance is present,
means for producing an azimuth determination on the basis of the analyzing means; and
means for delivering navigation information on the basis of the azimuth determination.

According to a sixth aspect, the invention relates to an apparatus for determining an azimuth in a navigation application, comprising:
means for acquiring first azimuth data from magnetic compass means,
means for acquiring second azimuth data from gyroscope means,
means for using the first and second azimuth data to detect a presence of a magnetic disturbance,
means, operative when a magnetic disturbance is detected, for determining the azimuth from one of:
i) a combination the first and second azimuth data, or
ii) the second azimuth alone, and
means for calibrating or updating an azimuth reference and/or a bias and/or a scale factor of the gyroscope means using the first azimuth data when substantially no magnetic disturbance is detected.

According to a seventh aspect, the invention relates to a computer program for determining an azimuth using a first azimuth data source responsive to a magnetic field to deliver first azimuth data, and a second azimuth data source delivering second azimuth data independent of magnetic field, the computer program comprising:
executable code for analyzing the first and second azimuth data to determine whether a magnetic disturbance is present, and
executable code for determining the azimuth selectively on the basis of the first azimuth data, the second azimuth data, or a combination of the first and second azimuth data, as a function of the an output of the executable code for analyzing.

The optional aspects presented above in the context of the first aspect are applicable mutatis mutandis to the second, third, fourth, fifth, sixth and seventh aspects presented above.

BRIEF DESCRIPTION OF THE DRAWINGS

The patent or application file contains at least one drawing executed in color. Copies of this patent or patent application publication with color drawings will be provided by the Office upon request and payment of the necessary fee.

The invention and its advantages shall become more apparent from reading the following description of its preferred embodiments, given purely by way of non-limiting examples, with reference to the appended drawings in which:

FIG. 9b is a graph showing a detail of the trace contained in the graph of FIG. 9a.

DETAILED DESCRIPTION OF THE PREFERRED EMBODIMENTS

Figure 1:
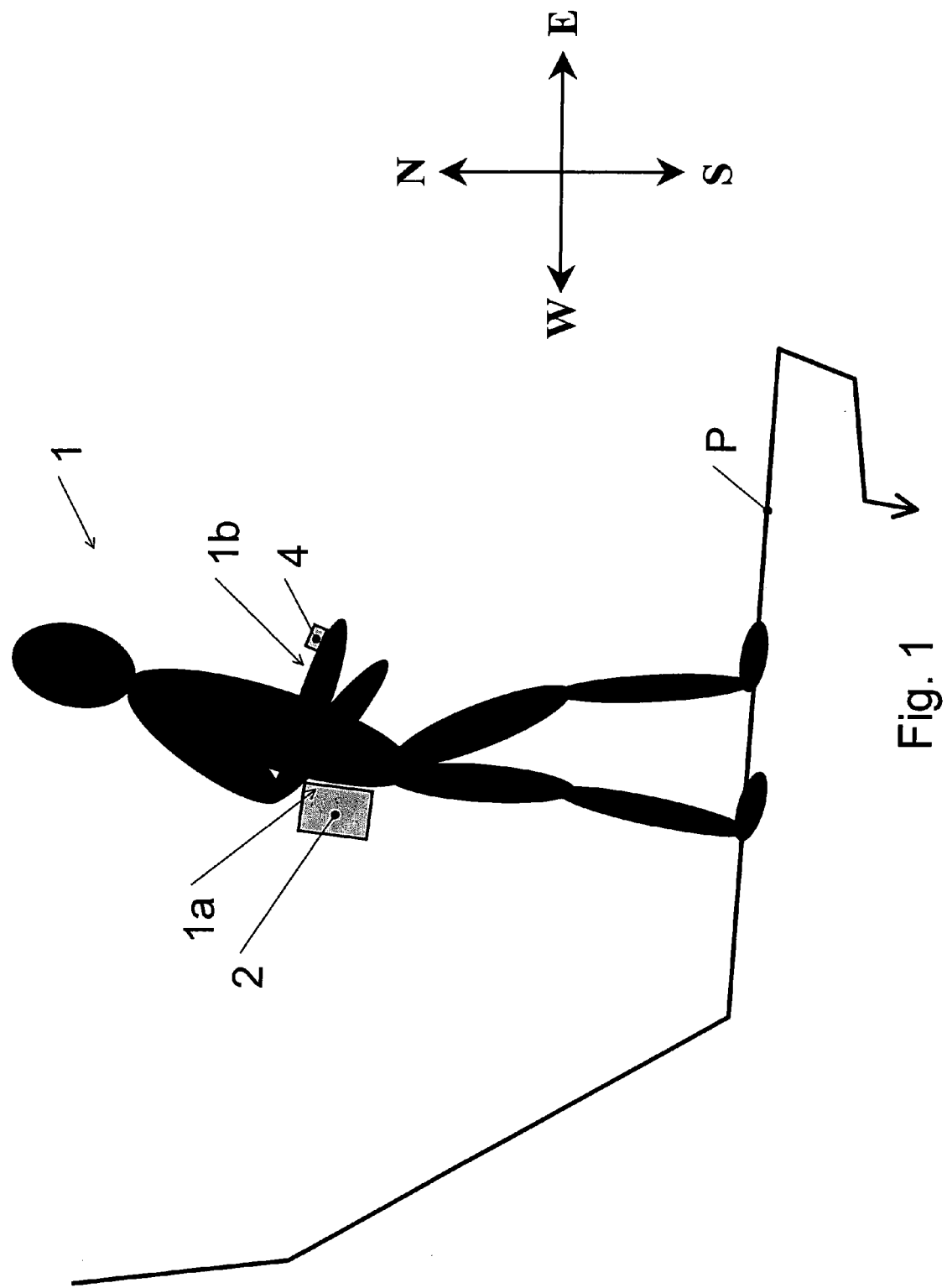
FIG. 1 is a schematic diagram showing of an application of the preferred embodiments in a pedestrian navigation application.

FIG. 1 is a simplified representation of a human pedestrian 1 moving along a path P and wearing at the back of the waist 1a an azimuth determination unit 2 in accordance with a preferred embodiment of the invention. The waist-mounted—or trunk mounted—position is preferable as that part of body is relatively more static, and thus less likely to generate spurious movements which can affect the accuracy of the azimuth sensing gyroscope and magnetic compass (cf. FIG. 2). Also, the waist and lower back are generally kept well aligned with the direction of normal walking motion. In the example, the unit 2 operates in association with a user interface 4 worn around the wrist.

Depending on applications, the azimuth determination unit 2 can be a self-contained system providing just azimuth data, or it can be materially and functionally integrated into a pedestrian navigation system that provides more complete navigation information, such as displacement, path followed, speed, etc, as described in U.S. Pat. No. 6,826,477 issued on Nov. 30, 2004 and/or in U.S. provisional application No. 60/552,399 filed on Mar. 12, 2004, both to the present assignee, whose contents are herein incorporated by reference. In the latter case, the azimuth information provided by the unit 2 is exploited directly by the pedestrian navigation system.

In what follows, the description given is applicable to embodiments of the azimuth determination apparatus implemented either to provide solely azimuth determination as an end user function, or as a subsystem for a navigation system, e.g. in accordance with the aforementioned U.S. patent and U.S. provisional patent application to the Assignee, whether it be for a pedestrian navigation, vehicle navigation or other navigation application.

Figure 2:
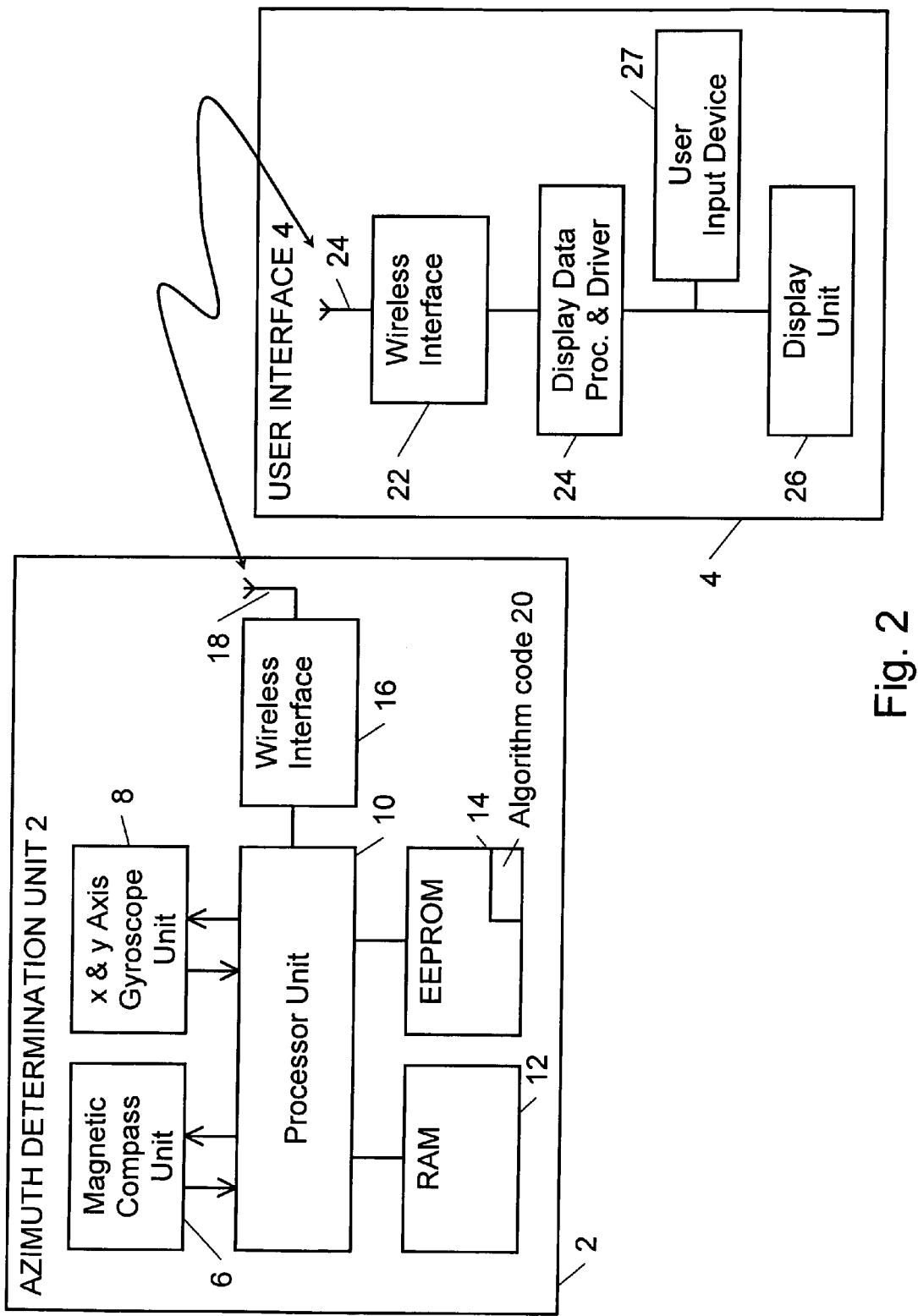
FIG. 2 is a simplified block diagram of the functional elements implemented in the azimuth determination apparatus according to the preferred embodiments.

FIG. 2 is a simplified block diagram of the azimuth determination unit 2 and its user interface 4. The azimuth determination unit comprises a magnetic compass unit 6 and a gyroscope unit 8 arranged to produce azimuth data referenced to a horizontal (X, Y) plane. Both the magnetic compass unit 6 and gyroscope unit 8 can be existing, commercially-available devices. As an example, a suitable compass can be obtained from Vectronix AG, Honeywell Inc., . . . , and a suitable gyroscope unit can be obtained from Murata, Analog Devices, Systron Donner, . . . . Typically, the magnetic compass is an electronic device based on a Hall effect sensor and provided with a digital data interface.

The gyroscope unit 8 is a standard electromechanical device. Depending on requirements and design choices, the gyroscope unit 8 can be equipped with either a single axis (Z axis gyroscope), a dual axis or a 3-axis gyroscope system. It comprises a digital data interface for outputting azimuth data referenced to North and for receiving recalibration signals, notably azimuth reference, bias update and scale factor data. The gyroscope unit 8 is an example of an azimuth data source independent of magnetic field.

The intelligence of the azimuth determination unit 2 is centered on a main processor unit 10 cooperating with a random access memory (RAM) 12 and an electrically erasable programmable read-only memory (EEPROM) 14. The main processor unit 10 exchanges data with the magnetic compass unit 6 and gyroscope unit 8, including the gyroscope's azimuth reference, bias and scale factor corrections. It outputs the optimized azimuth information to the user (hereafter referred to as the observer) via wireless interface 16 provided with an antenna 18, e.g. operating under the Bluetooth or WiFi protocol.

The term "observer" used throughout designates the entity whose azimuth is to be determined, and which is thus equipped with the sensor means, i.e. the magnetic compass unit 6 and gyroscope unit 8, and having access to the algorithms, a vehicle, etc.

The term "observer" covers notably humans, for instance the pedestrian 1 of FIG. 1, animals, objects, whose azimuth is to be determined, typically with respect to an own reference plane or axis of the observer. In the case of objects, the term observer covers inter alia vehicles and also objects subject to a voluntary or involuntary change in azimuth, or which are to be aligned with respect to a given azimuth.

In a typical situation, the observer for which/whom the azimuth is to be determined would be moving, continuously or discontinuously, by a displacement in a two-dimensional plane or in three-dimensional space, and/or by effecting a rotation about an own axis, e.g. a turn on the spot in the case of a human observer. The azimuth determination can then serve to determine an evolution in the azimuth of the observer over time. This evolution can be used to produce navigation information, for instance.

The determined azimuth is typically produced as real-time information.

It is assumed throughout that the observer, whatever the type, has an own reference axis or plane with respect to which the determined azimuth information can be identified or referenced. For instance, in the case of a human observer, the determined azimuth would be typically referenced with respect to the plane containing the spinal cord, i.e. the anteroposterior (forward-backward) axis. For a vehicle such as road vehicle, the determined azimuth reference would be typically reference with respect to the main forward-rear axis, etc.

In addition to the programs for general device management, the EEPROM 14 contains one or a number of algorithms 20 in the form executable code for implementing the optimized azimuth determination algorithm, including case modeling in accordance with the invention, as explained in detail below.

The user interface 4 comprises a wireless interface 22 and antenna 24 adapted to the protocol used by the azimuth determination unit's wireless interface 16. The data exchanged with the azimuth determination unit 2 is processed by a unit 24 that additionally provides data display processing and display driver functions for a liquid crystal display (LCD) 26 and a user input device 27 comprising pushbuttons or the like for entering user commands. Where these user commands concern the operation of the azimuth determination unit 2, they are sent to the processor unit 10 of the latter via the wireless interfaces 22 and 16.

Alternatively, the main processor 10 can communicate with the user interface by a cable connection using e.g. a standardized protocol, such as the RS232 protocol.

The algorithms 20 use a methodology to compute an optimal azimuth for navigation. In the present embodiment, the algorithm's inputs are synchronized compass and gyroscope azimuths delivered respectively by the magnetic compass unit 6 and gyroscope unit 8. The output produced by the optimized azimuth determination apparatus is information derived selectively from the signals of either the compass unit 6 or the gyroscope unit 8, or from a combination of signals from both units 6 and 8, in which:

magnetic disturbances on the compass azimuths are mitigated by the referring to the gyroscope data and,
the bias and scale factor of the gyroscope data are autonomously calibrated using the compass data,
as appropriate.

The optimization of the azimuth information is achieved principally by coupling data between the compass and gyroscope using determined heuristics expressed by the algorithms. The data from those two azimuth data sources are submitted to case modeling algorithms which determine which of the two are deemed to be the most reliable, on the basis of the sequence history of previously-acquired data and actions taken, and on the current data. The actions taken are signaled by flags, as explained further.

Basically, the gyroscope unit 8 is used to compensate for compass errors due to magnetic disturbances, while the compass provides long-term stability of the determined azimuth. The compass is thus used to produce low frequency azimuth data sampling, while gyroscope provides the high-frequency azimuth data component.

Typically, the gyroscope is used only for short term data acquisition, e.g. on the order of 5 to 10 minutes maximum in a pedestrian navigation application, and/or only when the algorithm detects that the compass unit 6 is magnetically disturbed. Both the compass unit 6 and gyroscope unit 8 operate in concert in a synchronized manner, and are kept permanently activated. The gyroscope serves to detect when the compass is disturbed. To this end, the azimuth data produced by the compass and gyroscope units 6 and 8 are repeatedly compared at successive times. A magnetic disturbance is evidenced by the onset of an anomalous disparity between the compared data. (In a magnetically non-disturbed environment, a disparity evolves gradually over time, due mainly to the drift of the gyroscope.)

At the same time, when the azimuth acquisition is passed over to the gyroscope, and the system moves into an environment which is magnetically stable, the compass is used to update the bias and/or the scale factor of the gyroscope.

By contrast with classical correction and recalibration procedures, which are ordained as a function of just the time variable, the present approach is based on indicators which inform on whether the compass signal is good or not, and likewise for the gyroscope signal. These indicators reflect external conditions and determine when to update and recalibrate. The approach is thus based on a case-by-case basis. For a given case, the algorithm decides which among the magnetic compass unit 6 and the gyroscope unit 8 delivers the most accurate data, whether the compass data should be recalibrated on the basis of the current gyroscope data, or conversely whether the gyroscope bias, offset, or scale factor should be corrected on the basis of the compass data, and other parameters. These decisions are established on the basis of the aforementioned external conditions detected at successive sampling time windows, which effectively provide a reference history for current and future decisions. Each decision gives rise to the possibility of making a transition from using the magnetic compass unit 6 to using the gyroscope unit 8, or vice versa, or a combination of both the magnetic compass and the gyroscope unit, with adapted weighting coefficients.

Although a sampling time window itself is bounded by a time limit, within which the data are considered, the conclusion for the action to be taken is not time constrained. For instance, if the system is in an environment which is magnetically disturbed, and if beforehand the system was in a stable environment, then the conclusion taken may be to continue to use the gyroscope, which was recently calibrated with the last value of the compass that was good (before the magnetic disturbance), until the magnetic stability is ascertained over a certain period.

The optimized azimuth data can be used e.g. to calculate a trajectory by combining it with a distance or displacement information, as taught in the aforementioned U.S. Pat. No. 6,826,477 issued on Nov. 30, 2004 and/or in U.S. provisional application No. 60/552,399 filed on Mar. 12, 2004, both to the assignee.

In a navigation application, the azimuth determination unit 2 is associated to one or more accelerometers (not shown), notably to detect step movements (paces) in the case of a pedestrian navigation. The EEPROM 14 then further includes one or a number of step models, to determine step distances (length of a pace) and directions of those steps with respect to pedestrian (i.e. backwards, forwards, left, right), and an algorithm to calculate a displacement by combining the acquired azimuth data and step motion data at successive sampling intervals. Each sampling interval then gives rise to a vector segment, the sum of which yields a total displacement vector from a determined point of origin.

The embodiment is derived exclusively on case modeling to solve the compass-gyroscope integration challenge. At the outset, it defines three main classes of navigation situation, such as: "straight line", "curves" and "general navigation", and follows with a fractioning of the azimuth computation with respect to the different potential scenarios. This case modeling replaces the different weights of data in a classical navigation Kalman filter.

The algorithms use a specific code for each situation encountered. A code describes an instant navigation situation being faced. The codes are acquired successively at respective time windows and stored to form a time-ordered sequence. The algorithm produces and analyses this sequence to determine the action to be taken, if any, at a current time window. The code sequence thus bares analogy with a DNA sequence in biology.

Real-time computation of azimuth is achieved using simultaneously synchronized compass and gyroscope data. At a given time, in addition to the current data, the algorithm considers one or more window(s) of earlier compass and gyroscope data that will help to deduce some navigation situations (or cases). The different cases will activate a corresponding series of actions for correcting and improving the computed real-time position.

The cases are differentiated into two categories: geometrical and "environmental" (i.e. dependent on environmental, or ambient, conditions, notably the possible presence of magnetic field disturbances).

Geometrical and Environmental Cases

The geometrical cases are the following:

1. Displacement along a straight line i.e. at a constant azimuth,

2. Displacement in a curve with a significant continuous change in azimuth (typically 90°, 180° changes, . . . ), 3. General case where the displacement does not belong to case 1 or 2 above.

The environmental cases are the following:

1. The observer is in a magnetically stable environment

2. The observer is in a magnetically disturbed environment

3. The observer is in a potentially magnetically disturbed environment.

For continuity purposes, an indicator of the previous window cases (geometrical and environmental) is always known.

The actions that result of the combination of the different cases are the following:

1. Computation (update) of the gyroscope bias,

2. Computation (update) of the gyroscope scale factor,

3. Update of the azimuth of the gyroscope on the azimuth of the compass,

4. Azimuth of navigation by a combination of the compass and gyroscope azimuths (e.g. based on the present case modeling algorithm, Kalman filter, autoregressive models, . . . ), 5. Azimuth of navigation from the azimuth of just the gyroscope unit, and 6. Azimuth of navigation from the azimuth of just the compass.

According to the above, an observer is regarded as moving along a straight line, along a curve, or a combination of both.

Here and throughout, the term "azimuth of navigation" means the azimuth used to compute a trajectory, in a navigation application.

The following is an example of how the history of external conditions, accumulated over successive time windows, advantageously influences on the decision regarding whether to make an azimuth data source transition or not.

Example of a History of External Conditions

During successive previous windows, the observer, for instance the pedestrian 1, was in a magnetically disturbed environment, but is currently in a stable environment for the first time. Under these circumstances, the current compass data is not given a full weighting, despite the detected stability, as the recent history suggests caution. Instead, the algorithm shall use a determined mixing ratio in the weighting coefficients applied respectively to the magnetic compass data and the gyroscope data. Next, by considering a set of possible combinations between the current window and the previous window, all future actions can be considered. For instance, these actions may concern updating the gyroscope bias, updating the gyroscope scale factor, updating the gyroscope azimuth against compass data, calculating the trajectory on basis of either one or a combination of the two azimuth data sources (gyroscope and compass). In addition, the actions can be decisions regarding whether the observer is continuing along a same straight line path that was previously identified, or is following a well-defined change of trajectory, such as a 90° or 180° change of azimuth, etc.

Azimuth Determination Algorithm

Two embodiments are disclosed for the algorithm to determine the azimuth.

First Embodiment of Algorithm

For each window, there is computed a linear regression on the gyroscope and compass azimuths considering time on the x axis (abscissa).

These are given respectively by:

For the compass=$A_{comp}$*Time+$B_{comp}$, with $S0_{comp}$: standard deviation of the model for the compass data, and For the gyroscope=$A_{gyro}$*Time+$B_{gyro}$, where:

$S0_{gyro}$ is the standard deviation of the model for the gyroscope data, $A_{comp}$ is the slope of the linear regression of the azimuth using the compass data, $B_{comp}$ is the offset or the constant of the linear regression of the azimuth using the compass data, $A_{gyro}$ is the slope of the linear regression of the azimuth using the gyroscope data, $B_{gyro}$ is the offset or constant of the linear regression of the azimuth using the gyroscope data.

The aforementioned standard deviation quantities $SO_{comp}$ and $SO_{gyro}$ can be understood as follows, where the standard deviation is determined as:

SOx=sqrt ($\Sigma(x_i-xmodel)^2/(N-1)$), where $x_i$ represents the values of the sample, xmodel represents the corresponding values given by the model, and N is the number of values in the sample.

For example, in the case of $SO_{comp}$ for a straight line trajectory, the model for the azimuth is then a constant, which is equal to the average of the sample values, and the standard deviation is in this case:

$SO_{comp}$=sqrt ($\Sigma(Compass_i-CompassAverage)^2/(N-1)$), where $Compass_i$ represents the azimuth measurements from the compass, CompassAverage represents the average of the $Compass_i$ values and N is the number of measurements considered.

In the above, the Σ indicates the summation from i=1 to N.

The above example and explanations can be transposed in the same way for the gyroscope data, by replacing $S_{comp}$ by $S_{gyro}$, $Compass_i$ by $Gyroscope_i$, and CompassAverage by GyroscopeAverage.

The size of the window can be variable and also depends on the type of application and the kind of hardware used (memory, processor, . . . ). For personal navigation, a window on the order of 10 seconds can be considered.

Geometrical Cases

The absolute information regarding the geometrical cases is contained in the S0_gyro, $A_{comp}$ and $A_{gyro}$ parameters.

If $S0_{gyro}$<threshold_$S0_{gyro}$, and $A_{gyro}$<threshold_$A_{gyro}$—Max then it is deduced that the observer 1 is moving along a straight line (i.e. facing the same direction), or going around a continuous turn.

If $A_{gyro}$>threshold_$A_{gyro}$_Min, then it is assumed that the observer 1 is going through a significant continuous change in azimuth;

In the above, threshold_$S0_{gyro}$ and threshold_$A_{gyro}$_Min are a function of the type of gyroscope, especially for threshold_$A_{gyro}$_Min, since it takes into account the stability of the gyroscope bias.

Figure 3:
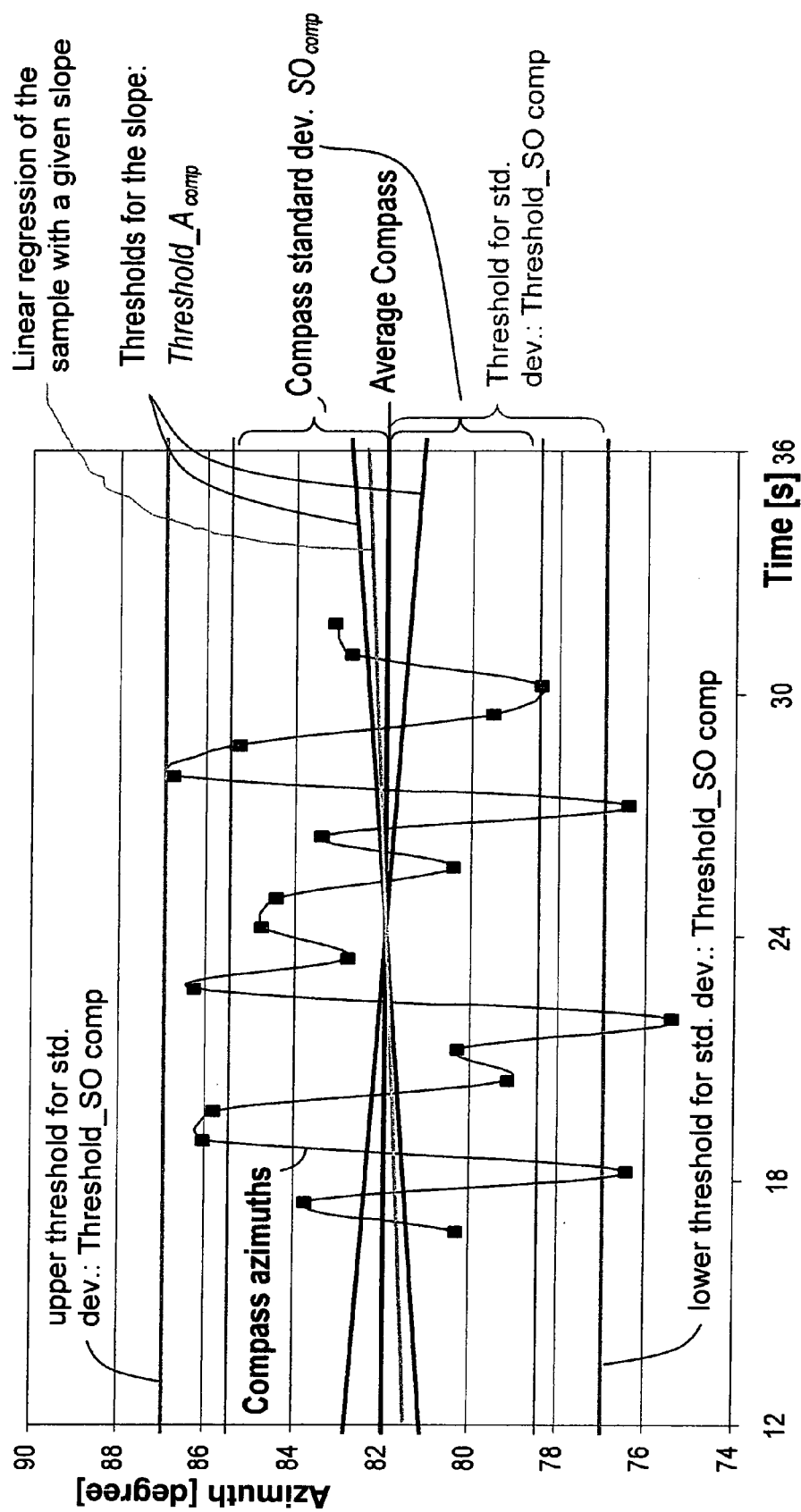
FIG. 3 is a plot of compass azimuth data on azimuth vs. time axes, indicating corresponding statistical data used in an embodiment of the algorithm.

FIG. 3 illustrates graphically the parameters for the case of compass Threshold_Acomp, and Threshold_SOcomp, with the compass standard deviation SOcomp and the compass azimuths. The compass azimuths are plotted as small squares against an azimuth axis (ordinate) expressed in degrees, and a time axis (abscissa) expressed in seconds, and connected to form the curve shown. The figure shows a sampling of the compass azimuth. The standard deviation $SO_{comp}$ has been calculated and inserted above and below the average compass value (horizontal line), as indicated by curly brackets on the right-hand side of the plot.

The linear regression is indicated as a straight line crossing the average compass value and having a slope which can be calculated.

Also shown are the two slopes of the linear regression of the sample, which have a positive and a negative gradient respectively, and upper the and lower thresholds for the standard deviation Threshold_SOcomp (top-most and bottom-most lines on the plot, indicated by the curly brackets on the right hand side).

It will be understood that a corresponding figure can be produced for the gyroscope data.

A less reliable methodology, but which can be adequate for some applications, consists in assessing the slope/trend of the window considering first and last data. The rationale here is as follows.

If the gyroscope is well calibrated (bias), then, by facing a constant direction, the azimuth output should be constant and therefore easily modeled by the linear regression inducing small residuals. If, on the contrary, the gyroscope is not well calibrated and presents a bias problem, the output will be a straight line with a slope $A_{gyro}$, but still a straight line. This leads to the same conclusion as before.

Additionally, if the observer 1 is in a magnetically non-disturbed environment, then $A_{comp}$ should be close to 0 and $SO_{comp}/SO_{gyro}$ is close to 1.

A check on the computed azimuths is performed to confirm the geometrical case.

Second Embodiment of Algorithm

For each window, there is computed:
a linear regression on the gyroscope and compass azimuths, considering time on the x axis, and the standard deviations of the compass data and of the gyroscope data.

This gives the following conditions:

Compass=$A_{comp}$*Time+$B_{comp}$, $S0_{comp}$ normal standard deviation

Gyroscope=$A_{gyro}$*Time+$B_{gyro}$ with $S0_{gyro}$: standard deviation of the model The parameters determining the geometry of the azimuth are:

$A_{comp}$<threshold_ $A_{comp}$ $S0_{comp}$<threshold_ $S0_{comp}$ $S0_{gyro}$<threshold_$S0_{gyro}$, where the three last thresholds are adapted dynamically as a function of the time elapsed from the last gyroscope update.

Environmental Cases

The following is applicable to both the first and second embodiments of the algorithm discussed above.

The interest is to define if the area containing the observer is magnetically disturbed or not.

Magnetic disturbances are identified in the following way:

If $S0_{comp}/S0_{gyro}$>threshold_SO then the observer 1 is in a magnetically disturbed environment.

Additionally:

if $A_{comp}/A_{gyro}$<0, then the compass and gyroscope go in an opposite direction. This condition can serve as an indicator of magnetic disturbance, but need not necessarily be used as such.

This is explainable by the fact that if there are no magnetic disturbances, the residuals should be approximately the same for both the gyroscope and the compass. If a magnetic disturbance occurs, then it introduces more noise in the measurements and brings them away from the regression.

If the observer has just left a magnetic disturbed environment, the first non-disturbed window will still be considered potentially disturbed.

The stability of the magnetic 3D vector within the window period is also an indicator of the presence of a magnetic disturbance.

In a magnetically non-disturbed environment, the difference of slope between the two linear regressions ($A_{comp}$−$A_{gyro}$) is a function of the gyroscope bias only, if dealing with a straight line trajectory case, and a function of both the bias and scale factor if dealing with a curve case.

Methodology

For a real-time positioning application, the position is determined in two steps.

Step 1: firstly, there is implemented an azimuth solution that takes into account the conclusions from the previous windows to determine whether or not to use: solution i) the compass azimuth data only, solution ii) the gyroscope azimuth data only or solution iii) a combination of both the compass and gyroscope azimuth data. This is the position the user will see in real-time. During this window-lag period, the two other solutions are still computed simultaneously.

Step 2: secondly, once the window data is buffered, the environmental and geometrical cases are identified. The optimal azimuth (azimuth of navigation) is then computed and the real-time position automatically updated, benefiting therefore from the information present in the window time frame. If, during this period, it is judged optimal to compute and update the bias and scale factor of the gyroscope, these tasks are also carried out.

Description of the Computation Process: Azimuth & Position

The computation process for azimuth and position is performed by an algorithm, of which two examples are given below.

EXAMPLE 1

The algorithm of the azimuth and position computation process according to the first example is conducted in the following ten steps.

1. Compute the azimuth "i" from: i) the gyroscope, ii) the compass and iii) the combined solution in parallel (three different solutions). This results in navigation in 3 different real-time positions.

Obtain n samples of azimuth values "i".

2. For the n samples, apply the case modeling discrimination on the window. This yields the following information: displacement along a straight line, displacement along a curve, magnetically disturbed or stable environment situation.

3. Combine the environmental and geometrical case to identify the window pattern and to produce some preliminary conclusions. For example, if the observer moves along a straight line in a disturbed environment, this would call for reliance on the gyroscope only.

4. Check the previous window pattern for continuity. For example, if the previous and actual windows indicate a constant azimuth, check that the direction between windows is continuous and/or make the necessary check on the azimuth from the compass.

5. Apply the above-defined actions numbered 1 to 4 for the combination of all the different cases identified in items 1 to 6 specified supra in the section under the heading "Geometrical and environmental cases"

(two actions of the different families can take place in the same window) corresponding to the window identified case. This is the azimuth of navigation.

6. Check whether the corrected azimuth of navigation differs from one of the solutions computed in step 1 of the present algorithm.

7. Re-compute the trajectory within the window with the new azimuth of navigation if necessary.

8. Update the real-time position on the new position if necessary.

9. Consider the situation identified in the present window to select, from among the three azimuth computation possibilities, the one to be used for real-time output to the user.

10. Return to step 1 of the present algorithm.

EXAMPLE 2

The algorithm of the azimuth and position computation process according to the second example is conducted in six steps.

1. Compute the azimuth and the position "i" on the basis of the gyroscope azimuth corrected with the parameters obtained from the last gyroscope bias update. This results in navigation in real-time position. Use this procedure to obtain n samples.

2. For a window of "n" samples acquired from step 1, adapt, if necessary, the thresholds for the standard deviations of compass and gyroscope.

3. Determine whether or not the azimuth in the window can be considered as corresponding to a straight line path in a magnetically undisturbed environment.

4. In the affirmative at step 3 of the present algorithm, update the gyroscope azimuth to the compass azimuth, providing new parameters to correct the bias.

5. Update the position:
either calculate a new position for all samples since the previous bias update, or
estimate an error.

For all other cases, i.e. either a path that is not straight or in a magnetically disturbed environment, increment (shift) the window by one sample batch and considers the next batch of "n" samples.

6. Calculate new corrected position, if possible.

Error Estimation on the Position

The estimation rests on the assumption that the position $(x_0, y_0)$, the x-axis pointing to the magnetic North, and its evolution, at time $t_0$, is exact. At each time window $t_i$, there is added a distance $(I_i \cos \alpha_i)$, where $I_i$ is the length of the ith step and $\alpha_i$ its azimuth, whereby the coordinates xi and yi become respectively: $x_i = x_0 + \Sigma(I_k \cos \alpha_k)$, $y_i = y_0 + \Sigma(I_k \sin(\alpha_k))$.

Here, $\alpha$ represents the azimuth itself. It is then the angle between the magnetic North and the direction of the movement by the observer, turning clockwise.

It is assumed that the angle $\alpha$ is linearly deviating from the correct value. At the position $(x_N, y_N)$ and time $t_N$, a linear regression of the angle is performed, providing the following corrections: m for the slope and h for the offset.

In order to obtain the right position at time $t_N$, the angle $\alpha_i$ needs to be corrected between $t_0$ and $t_N$:

$$i = 1 \ldots N \quad \alpha_i' = \alpha_i - mk_i(t_i - t_{i-1}) - hk_i$$

where
$k_i = (t_i - t_0)/(t_N - t_0)$,
m is the slope of the linear regression, and
h is an offset.

Figure 4:
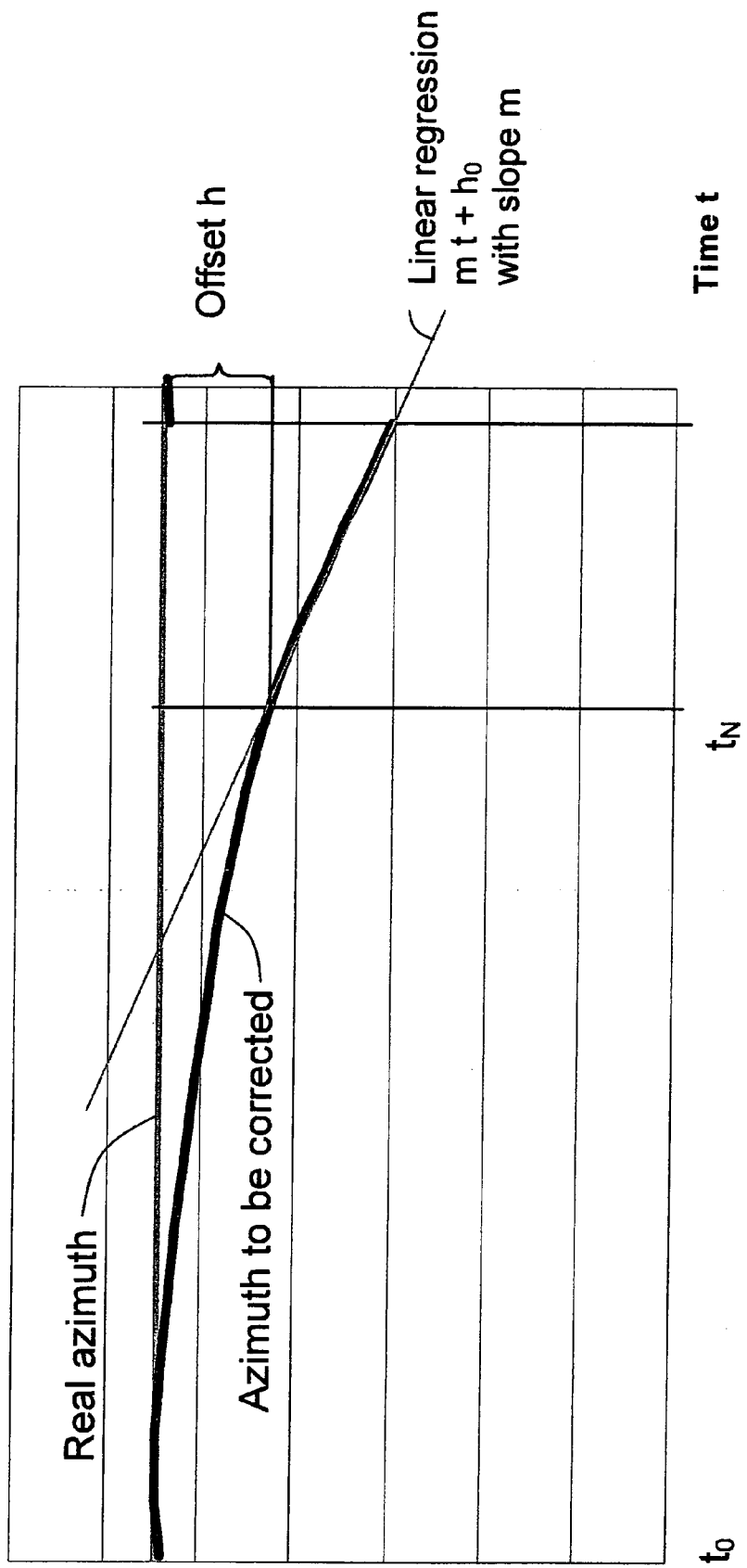
FIG. 4 is a plot showing an example of a real azimuth trace and a computed azimuth to be corrected on azimuth vs. time axes, with indications of offset and linear regression as used in an embodiment of the algorithm.

FIG. 4 illustrates graphically the values m and h above for a linear regression on a deviating curve. In the illustrated example, the azimuth is expressed along the ordinate as a function of time, along the abscissa, for two plots: the real azimuth taken by the observer, in this case a straight path (unchanging azimuth) shown as a horizontal line, and the determined azimuth (shown as a curved trace), which is to be corrected.

A new evolution can then be calculated as follows: $x_i' = x_0 + \Sigma(I_k \cos(\alpha_k'))$, $y_i' = y_0 + \Sigma(I_k \sin(\alpha_k'))$.

Such a method involves the values of the angle from $\alpha_0$ to $\alpha_N$. If these values are not available, it is possible to estimate the error on the position. Consider the example of the x-coordinate:

$$x_N' = x_0 + \sum (l_i \cos(\alpha_i')) = x_0 +$$
$$\sum (l_i \cos(\alpha_i - mk_i(t_i - t_{i-1}) - hk_i)),$$
$$[\text{where } k_i = (t_i - t_0)/(t_N - t_0)] = x_0 +$$
$$\sum (l_i \cos(\alpha_i) \cos(mk_i(t_i - t_{i-1}) - hk_i) +$$
$$l_i \sin(\alpha_i) \sin(mk_i(t_i - t_{i-1}) - hk_i)) = x_0 +$$
$$\sum ((x_i - x_{i-1}) \cos(mk_i(t_i - t_{i-1}) - hk_i) +$$
$$(y_i - y_{i-1}) \sin(mk_i(t_i - t_{i-1}) - hk_i))$$

Approximating $(t_i - t_{i-1}) = (t_N - t_0)/N = \Delta t$, $k_i = i\Delta t/N\Delta t = i/N$, and, assuming that the corrections m and h are of small amplitude and taking a Taylor development for the cosine and the sine of the second order, yields:

$$x'_N = x_0 + \sum ((x_i - x_{i-1})\cos(if) + (y_i - y_{i-1})\sin(if))$$

where $f = f(m, h) = (m\Delta t - h)/N =$ $$x_0 + \sum ((x_i - x_{i-1})(1 - i^2 f^2/2) + (y_i - y_{i-1})(if - i^3 f^3/6)) =$$

$$x_N - \sum i^2(x_i - x_{i-1})f^2/2 +$$

$$\sum i(y_i - y_{i-1})f - \sum i^3(y_i - y_{i-1})f^3/6$$

In a similar way, the correction for $y_N$ is:

$$y_N' = y_N - \Sigma i^2(y_i - y_{i-1})f^2/2 - \Sigma i(x_i - x_{i-1})f + \Sigma i^3(x_i - x_{i-1})f^3/6$$

The method consists in calculating for each $(x_i, y_i)$, the summations:

$\mathrm{Sum}X = \mathrm{Sum}X + (x_i - x_{i-1})$, $\mathrm{Sum}Y = \mathrm{Sum}Y + (y_i - y_{i-1})$, $\mathrm{Sum}iX = \mathrm{Sum}iX + i(x_i - x_{i-1})$, $\mathrm{Sum}iY = \mathrm{Sum}iY + i(y_i - y_{i-1})$, $\mathrm{Sum}i2X = \mathrm{Sum}i2X + i^2(x_i - x_{i-1})$, $\mathrm{Sum}i2Y = \mathrm{Sum}i2Y + i^2(y_i - y_{i-1})$, $\mathrm{Sum}i3X = \mathrm{Sum}i3X + i^3(x_i - x_{i-1})$, $\mathrm{Sum}i3Y = \mathrm{Sum}i3Y + i^3(y_i - y_{i-1})$, Where X is the correction factor for the North (X) direction and Y is the correction factor for the East (Y) direction, and SumX and SumY are the position $x_i$, $y_i$ calculated with the angle not corrected. The estimation for the position $x_N$, $y_N$ is then:

$$x_N' = \mathrm{Sum}X - \mathrm{Sum}i2Xf^2/2 + \mathrm{Sum}iYf - \mathrm{Sum}i3Yf^3/6,$$

$$y_N' = \mathrm{Sum}Y - \mathrm{Sum}i2Yf^2/2 - \mathrm{Sum}iXf + \mathrm{Sum}i3Xf^3/6,$$

where f is, as before, the function: $f = f(m,h) = (m.\Delta t - h)/N$

It is therefore possible to have a real-time optimisation of the position N, taking into account a history of length N, without using a Kalman filter structure.

Cases-and-Action Relationship: the "DNA" Navigation Sequence

What follows is an illustration of the different possible actions connected to the different cases. It is clear that the different actions are application oriented, and can vary from one situation to the other, for example from car navigation to personal navigation.

The approach is analogous to that for expressing a DNA sequence in biology. In the present case, the sequence is constructed using the following symbolic representation for the sequence of cases and actions:

Co: Azimuth=Compass (i.e. azimuth determined only by the compass)

G: Azimuth=Gyroscope (i.e. azimuth determined only by the gyroscope)

FCG: Azimuth=Azimuth determined as a Function of compass and gyroscope (Kalman Filter, etc.)

BU: Bias update

SF: Gyroscope scale Factor update.

Table I below summarises the cases and actions for different situations, using the above symbolic representation.

TABLE I

Cases and actions for different situations (leftmost column), using the above symbolic representation.

| Situation | Straight line (SL) | Curve (C) | General displacement (GD) |
|---|---|---|---|
| Actual Window Magnetically stable environment | SL-Co | C-FCG | GD-Co |
| Actual Window Magnetically disturbed environment | SL-G | C-G | GD-G |
| Actual Window Potentially magnetically disturbed environment | SL-FCG | C-FCG | GD-FCG |
| Interval between bias update ok | BU | — | BU |
| Enough azimuth change to update the scale factor. | — | SF | — |

Information Used from the Previous Window (Abbreviation PW):

| | |
|---|---|
| Straight line: | PWSL |
| Curve: | PWC |
| Magnetically disturbed environment: | PWD |
| Potentially Magnetically disturbed environment: | PWPD |

An example of a possible result is the following sequence, starting from the earliest event: PWSL-PWD-SL-Co-BU . . . (sequence 1).

Referring to the DNA analogy, this sequence contains information both at the level of the elements themselves (PWSL, PWD, . . . ) and at the level of the order in which they appear. In other words, the information is organized as a sequence code that reflects the navigation history, by analogy with a genetic make-up in a DNA sequence. The order traces the history of the situations encountered and itself constitutes a source of information for present and future decisions and actions for obtaining a optimized azimuth determination.

The situation/intelligence behind sequence 1 above is the following:

Considering the previous window having yielded PWSL and PWD (first and second items of sequence 1). From that window, it is deduced that the observer was navigating in a disturbed environment along a straight line: this means that the gyroscope was used. During the present window, the observer is still along a straight line (the same one) SL (third item of sequence 1) but the ambient is magnetically stable. This means that the observer can navigate with the compass, as flagged by the abbreviation Co (fourth item of sequence 1). Moreover, it is also possible to make an update of the gyroscope bias, as flagged by the abbreviation BU (last item of sequence 1). Specifically, the bias update, because the observer is in a stable compass environment, it is possible to compare the gyroscope and compass outputs to update the gyroscope bias).

Figure 5:
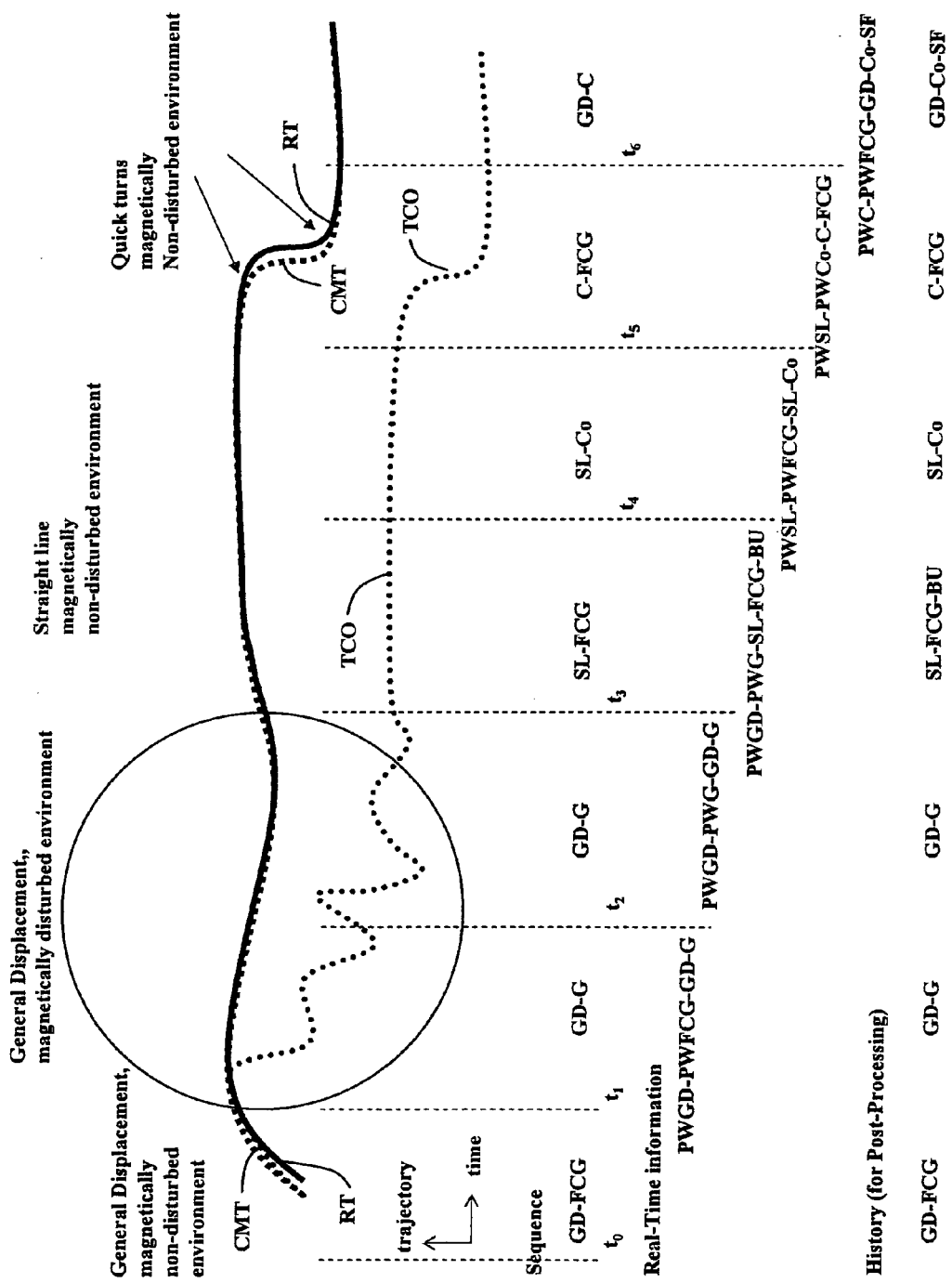
FIG. 5 is a diagram showing an example of two-dimensional trajectories, indicated by traces, against time. It represents a real trajectory, a trajectory calculated by a case modeling algorithm in accordance with a preferred embodiment of the invention, and a trajectory calculated on the basis of compass data only, the diagram also showing the local magnetic environment at different times, the derived case modeling sequence, real-time information, and history for post-processing at the different successive time windows during the trajectory.

FIG. 5 illustrates a second example of a navigation situation, showing three traces, each plotting a sample trajectory, as follows:

a first trace RT (heavy line) showing the real (actual) trajectory taken by the observer, a second trace CMT (broken line) showing the trajectory identified by case modeling in accordance with the invention, and a third trace TCO (dotted line) showing the trajectory determined on the basis of the magnetic compass only.

The plots for the three traces are shown in two dimensions, the ordinate (y-axis) corresponding to the North bearing, and the abscissa (x-axis) corresponding to the East bearing. The evolution in time is shown in superposition, evolving along the abscissa, to indicate where the observer (in this example a pedestrian) is located at a given moment.

The time span of the traces is divided into seven time intervals t0 to t6, each corresponding to a respective time window. For each time window, the figure indicates:
- the nature of the displacement (top part of figure), e.g. "General Displacement" "Non-magnetically disturbed environment", etc.
- the sequence portion associated with the time interval (indicated just below the trace),
- the real-time information deduced from the current sequence portions (indicated below the sequence portions), and
- the history of the displacement situations and the actions taken, for post-processing purposes (indicated below the real-time information).

At time interval t0, there is no particular detected environmental or displacement situation to note. Consequently, the algorithm deduces that the observer is following a trajectory that does not follow a strict straight line nor a pronounced or sharp change of direction. This is termed a "normal" free navigation situation. (For instance, if the observer is going along a pavement (sidewalk), he/she is not necessarily following it along a straight line.) In this case, the algorithm is flexible and can take into account either the gyroscope or compass data, or both. The situation is thus summarized as a general displacement (GD) in a magnetically non-disturbed environment where the compass and/or gyroscope can be used (FCG), expressed by the sequence portion GD-FCG.

The real-time information is composed of the current window and the window that immediately precedes it (previous window). It thus takes into account the nature of the information of the previous window. Using the above-defined notation the information contained in the sequence of the previous window is prefixed with PW. Hence, for time interval t1, the previous window (time interval t0) information is indicated as PWGD-PWFCG.

In addition, a flag can be added to real-time window information to indicate the execution of an action during that time window. The action in question can be e.g.: a compass update, a gyroscope update, etc. For example, the real-time time information for window t3 contains the flag "BU" in its last term, to indicate that a bias update was made for the gyroscope.

The history for post processing is similar to the sequence. Specifically, it comprises the sequence plus the aforementioned flags. This can be seen e.g. from time window t3, where it additionally contains BU, and likewise for t6, where it additionally contains the flag SF (scale factor). In other words, the history for post processing also records these flagged events.

An analysis of the information produced in connection with the situation for time windows t0 to t6 is as follows.

After time window t0 discussed supra, the observer enters a zone of magnetically disturbed environment (encircled portion of the traces) whilst continuing in a general displacement trajectory, for a period of two successive time windows, t1 and t2. Thus, for each of time windows t1 and t2, the sequence is expressed as GD-G, the term G at the end indicating that it is the gyroscope that it used for the azimuth determination.

Next, the observer at time window t3 leaves the magnetically disturbed environment (enters a magnetically non-disturbed environment) and also follows a substantially straight line path. The sequence for t3 thus contains the term SL (straight line), and FCG (azimuth determined as a function of compass and/or gyroscope). Indeed, both the compass and gyroscope are potentially capable of producing azimuth data under such an environment, but it is too soon after the magnetic disturbance to rely totally on the compass data. Moreover, the algorithm takes the opportunity of this entry into the magnetically non-disturbed environment to perform a bias update (BU) on the gyroscope by reference to the compass azimuth.

In time window t4, the algorithm determines that the magnetically non-disturbed environment has now lasted for a sufficiently long time to enable the azimuth data to be determined just from the compass data, having further regard to the fact that the observer is moving along a straight line. The corresponding sequence is thus expressed as: SL-Co. Note that at this time window t4, the algorithm has determined a "straight line" displacement condition for both the previous window (t3) and the current window. It exploits this determined continuation over consecutive windows of the straight line condition to advantage by establishing a continuity relation, in the sense that it keeps the same azimuth as obtained for the previous window.

At some point during time window t5, the observer takes two quick turns in succession (where the indicated arrows point on trace RT) while still in a magnetically non-disturbed environment. The corresponding curved trajectory is noted in the sequence by the term C. Because the compass may not have sufficient time to adjust to such quick changes in azimuth, the algorithm uses the gyroscope data as well to determine the azimuth, whereby the sequence for that time window is C-FCG.

Finally, at time window t6, the observer continues in the magnetically non-disturbed environment without further pronounced curves in the trajectory. The algorithm thus applies the case of a general displacement GD and uses the compass data alone for azimuth determination, giving the sequence GD-Co. Also, it decides to carry out a scale factor correction on the gyroscope during that window, giving the history sequence GD-Co-SF.

As the trajectory traces show, the case modeling based on the selective use at any time window of one of: i) compass data alone, ii) gyroscope data, and iii) a combination of both compass data and gyroscope data, as explained above, yields a determined trajectory (trace CMT) which is very close to the real trajectory (RT). Note that the overlap between the these two traced trajectories is almost complete, even when entering the magnetically disturbed environment.

By contrast, a trajectory determined solely on compass data (trace TCO) becomes highly accurate in the magnetically disturbed environment, and the thus-induced error is not corrected when leaving that environment, giving rise to a rapid error accumulation for calculating trajectories.

Such an implementation and modeling of the navigation behavior grants a great degree of flexibility, especially if specific situations become significant (90° or 180° turns, navigation in a particular direction, etc.).

More navigation data than the azimuth (such as the distance, altitude, . . . ) can be processed with this methodology.

Experimental results of azimuth determination based on the preferred embodiments are presented below with reference to FIGS. 6 to 9b. The experiments were conducted with a human pedestrian as the observer, taking a path comprising both indoor and outdoor trajectories. The azimuth determination was used for the computation of a trajectory, by associating the apparatus of FIGS. 1 and 2 with a personal navigation system further comprising accelerometers, step models and dead reckoning navigation algorithms such as described in U.S. Pat. No. 6,826,477 issued on Nov. 30, 2004 and/or in U.S. provisional application No. 60/552,399 filed on Mar. 12, 2004, both to the present assignee and whose contents are herein incorporated by reference.

Figure 6:
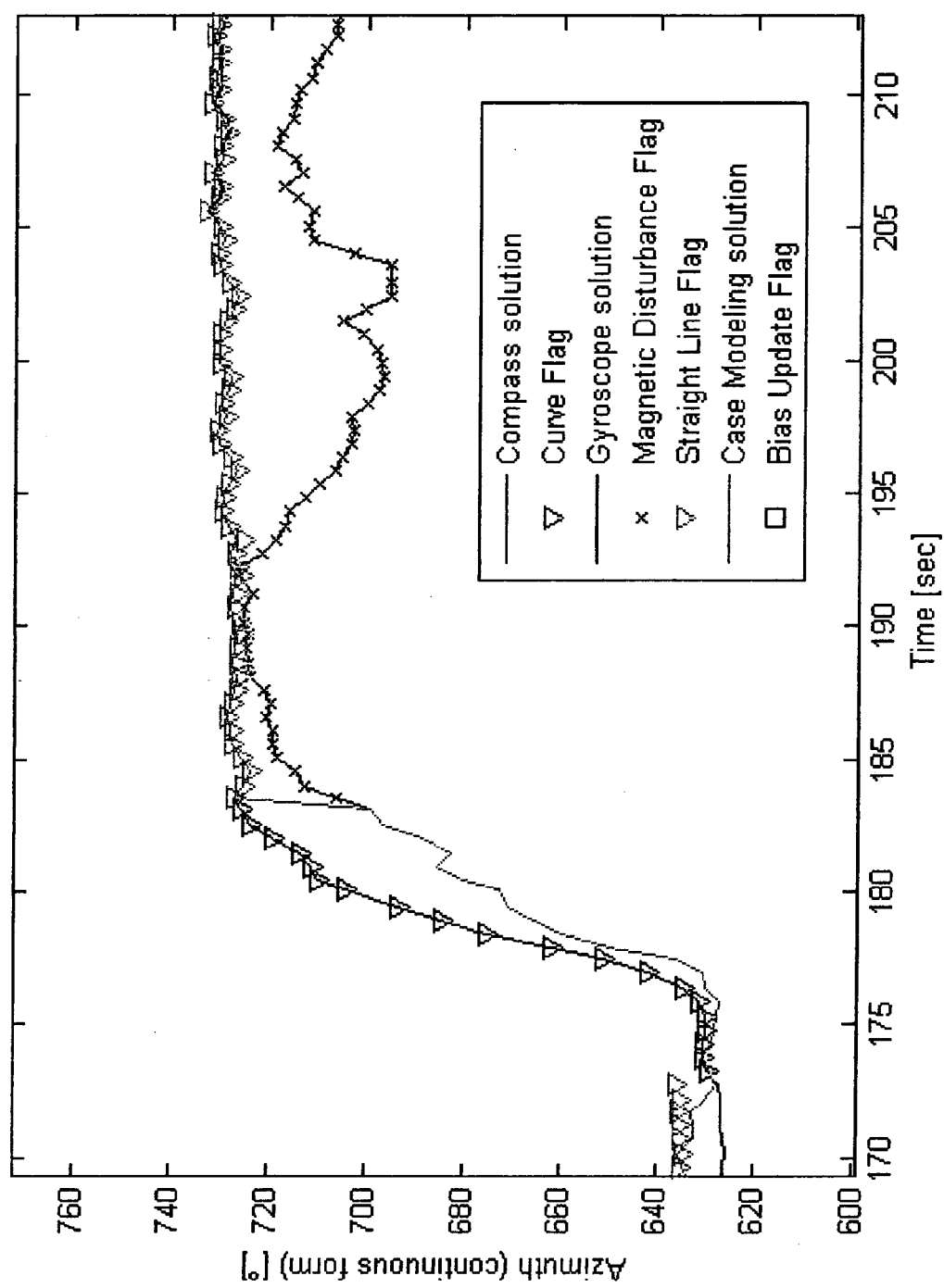
FIG. 6 is a graph showing the evolution of computed azimuths obtained respectively by: a magnetic compass only, a gyroscope only, and an optimized case modeling and associated flags in accordance with the preferred embodiments, for a first sample indoor-outdoor trajectory by a pedestrian.
Figure 8:
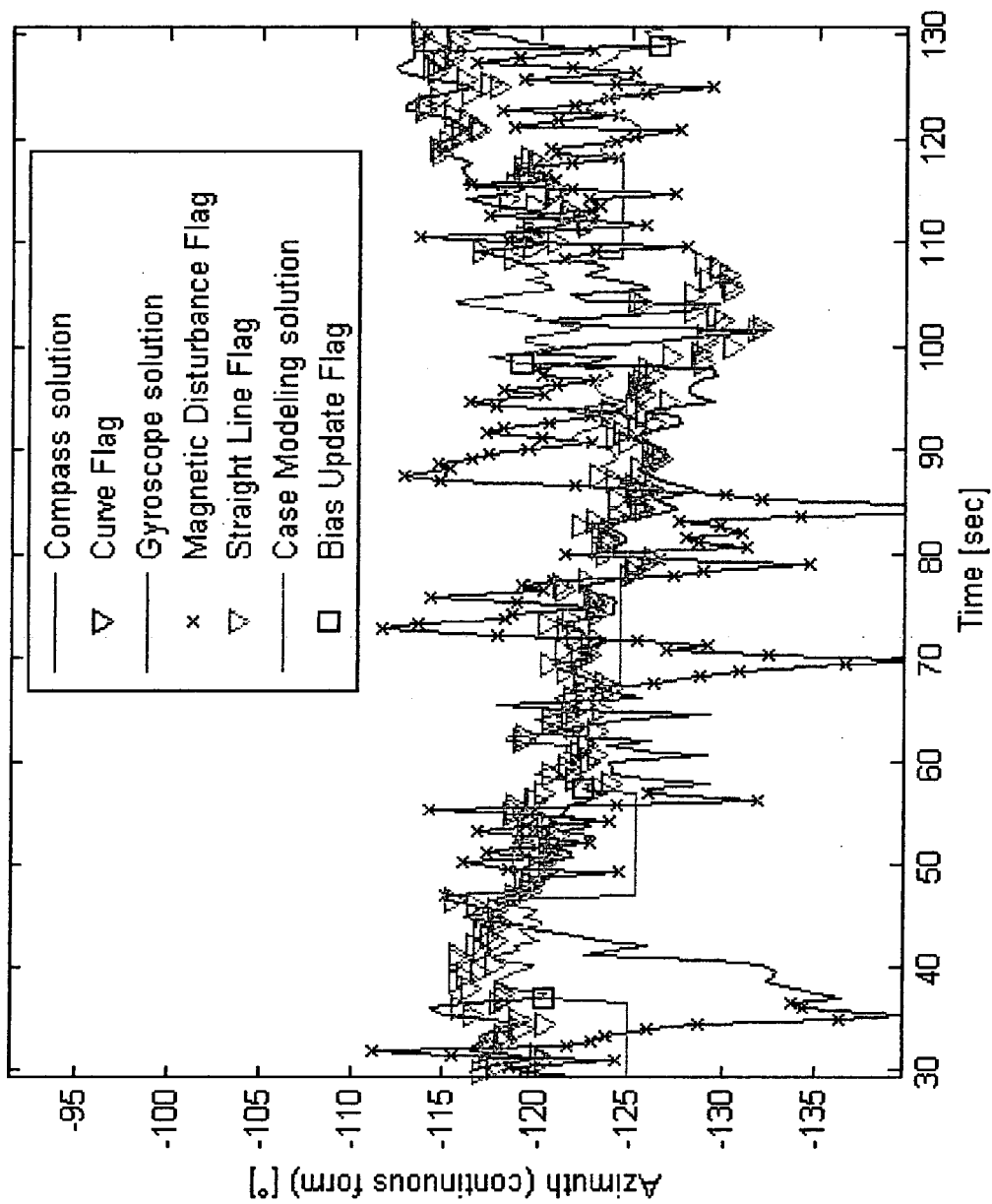
FIG. 8 is a graph showing the evolution of computed azimuths obtained respectively by a magnetic compass only, a gyroscope only, and an optimized case modeling and associated flags in accordance with the preferred embodiments, for a first sample straight line trajectory by a pedestrian.

FIGS. 6 and 8 each represent a two-dimensional graph showing the evolution of azimuth (continuous form) expressed in degrees, on the Y-axis against time in seconds, on the X-axis.

Figure 7:
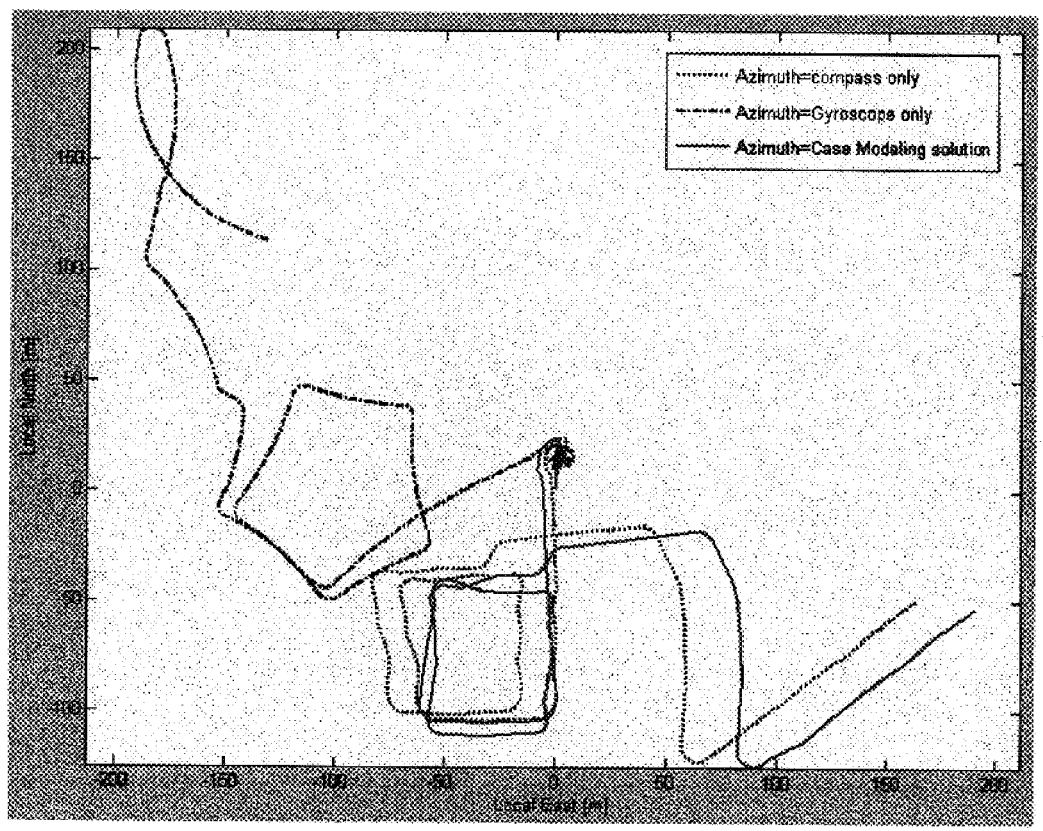
FIG. 7 is a graph showing the evolution of computed trajectories obtained respectively by: a magnetic compass only, a gyroscope only, and an optimized case modeling in accordance with the preferred embodiments, for the first sample indoor-outdoor azimuth presented in FIG. 3.
Figure 9A:
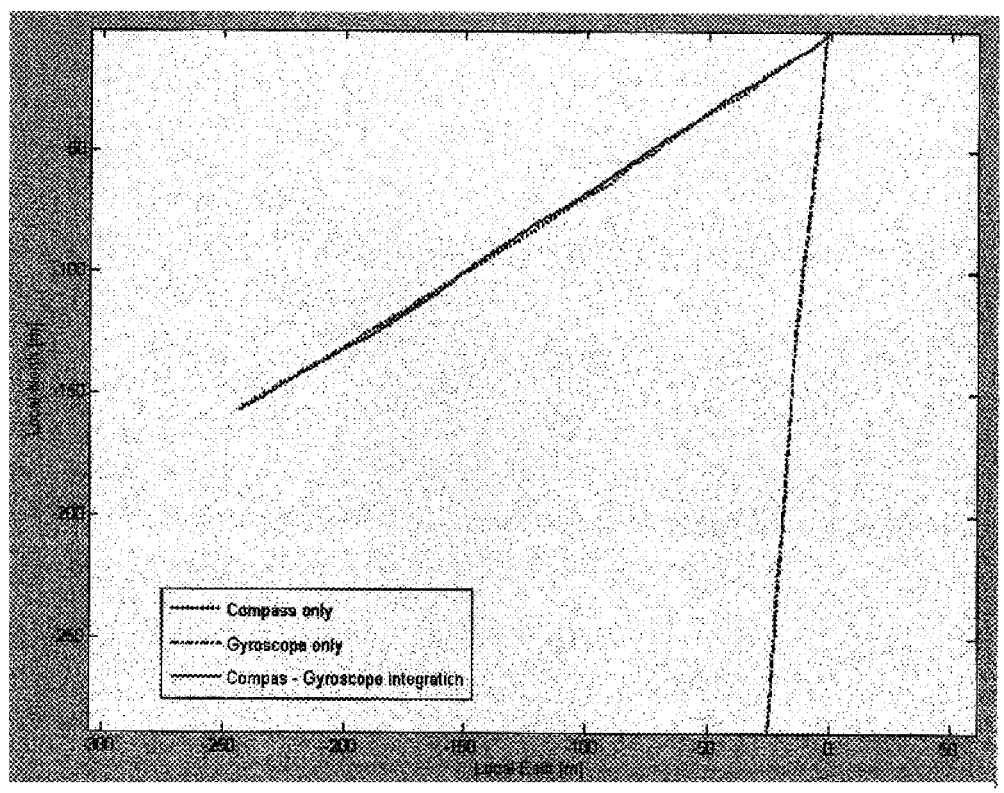
FIG. 9a is a graph showing the evolution of computed trajectories obtained respectively by: a magnetic compass only, a gyroscope only, and an optimized case modeling in accordance with the preferred embodiments, for a first sample straight-line trajectory by a pedestrian.
Figure 9B:
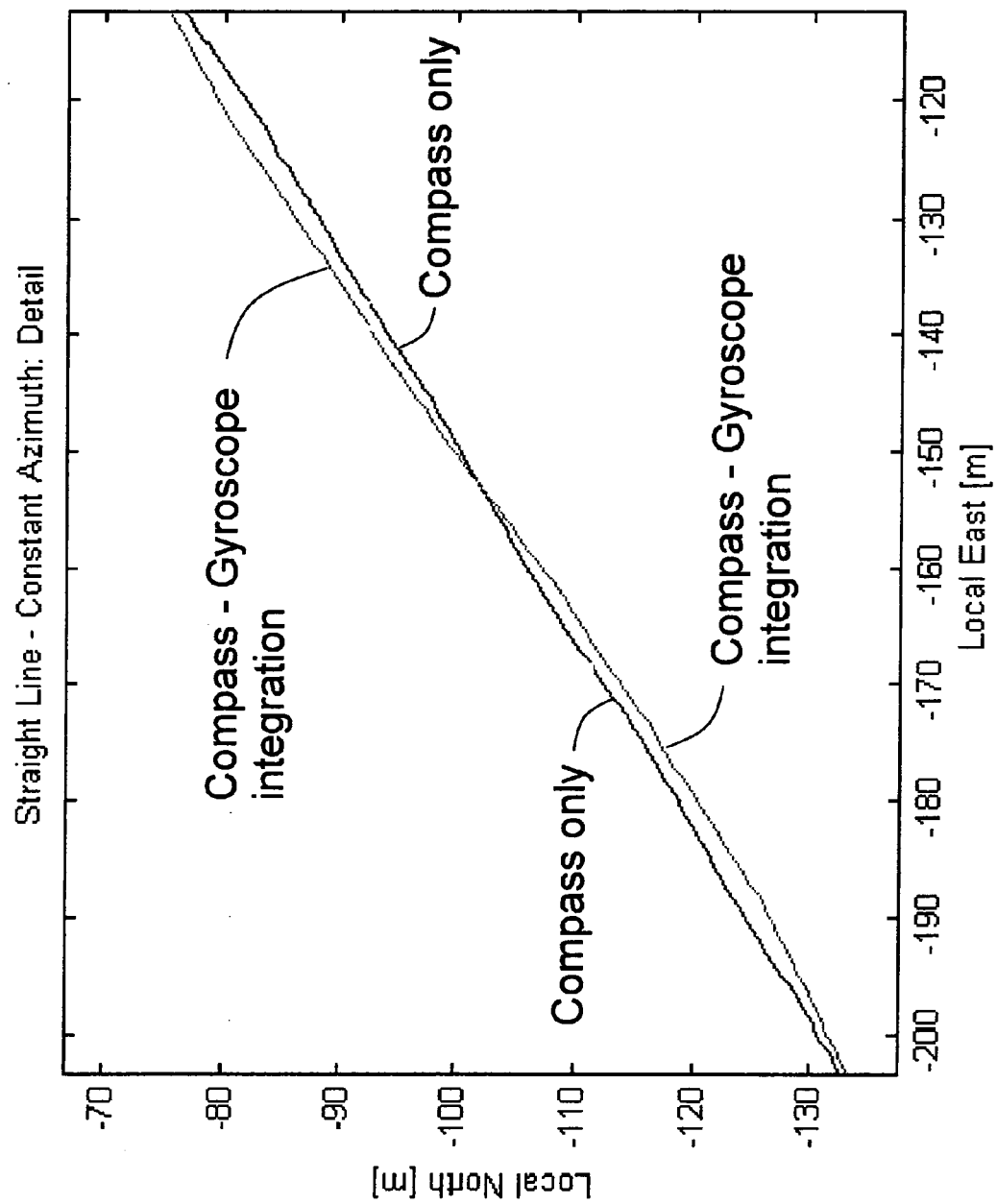

FIGS. 7, 9a and 9b each represent a two-dimensional graph showing the evolution of local North expressed in metres, along the Y-axis, against an East bearing expressed in metres, on the X-axis. FIG. 9b is a detail of the trace of FIG. 6b.

Throughout FIGS. 6 to 9b, the symbols are used to identify the curves:

dotted line: trajectory calculated from compass data alone,
broken line: trajectory calculated from gyroscope data alone,
continuous line: trajectory calculated from azimuth data produced by the embodiment (case modeling solution),
downward pointing triangles: curve flags,
upwardly pointing triangles: straight line flags,
squares: bias update flags.

FIG. 6 presents an example of the 3 simultaneous different azimuths computed. It shows a curve immediately followed by a straight line in a magnetically disturbed environment. The optimized, case modeling, solution recognizes the discrepancy between the gyroscope and the compass at the end of the curve, and automatically decides to switch to the gyroscope azimuth. Between the curve and the straight line period, the continuity is ensured by an update of the azimuth of navigation on the gyroscope azimuth.

FIG. 7 is a graph showing the evolution of the computed trajectories obtained respectively by a magnetic compass only, a gyroscope only, and an optimized case modeling for the sample indoor-outdoor azimuth presented in FIG. 3.

FIG. 8 represents a scenario that is totally different from that of FIG. 6, corresponding to a straight line indoor trajectory. The challenge in this particular case is to maintain a constant azimuth over a long period of time in both magnetic stable and disturbed environments. Specifically, the two-dimensional trajectories are obtained with different azimuths. The magnetic compass trajectory (dotted line) displays a general stability in direction, but some local magnetic disturbances degrade the real trajectory. The gyroscope-only trajectory (broken line) is smoother, but clearly degrades with time. The optimized, case modeling, solution in accordance with the invention (continuous line) merges the two azimuths (respectively from the magnetic compass and the gyroscope) to take the best of both of those data sources. In this way, the long-term stability of the magnetic compass and the short-term stability of the gyroscope are exploited to advantage to mitigate the effects of magnetic disturbances.

The trace indicates that the total trajectory was correctly identified as a straight line, and this independently of the various magnetically disturbed instances. The optimized, case modeling, solution in accordance with the invention also allows updates for the gyroscope bias along the trajectory. However, no update is made for the scale factor, this information being unnecessary on account of the constant heading.

FIG. 9a represents two-dimensional trajectories of a straight-line trajectory. The gyroscope-only trace (broken lines) was obtained with no update of the bias or scale factor. While this trace clearly exhibits a straight line, the absolute azimuth information is missing. The compass-only trace (dotted lines) indicates the presence of some light magnetic disturbances. The case modeling solution (full lines) takes advantage of the gyroscope output, but updates its absolute orientation on the compass data, as shown more particularly in the detailed view of FIG. 9b.

While the above embodiments are eminently suited to personal navigation, they can also be used for vehicle navigation and, more generally, to all applications requiring reliable azimuth data.

It is apparent to those skilled in the art shall appreciate that various modifications and equivalents of the preferred invention described herein can be made while remaining within the spirit and scope of the invention as defined in the following claims.

The invention claimed is:

1. A method of determining an azimuth using a first azimuth data source responsive to a magnetic field to deliver first azimuth data, and a second azimuth data source delivering, independent of magnetic field, second azimuth data comprising the steps of:

analyzing said first and second azimuth data to determine whether a magnetic disturbance is present, and
determining said azimuth selectively on the basis of: said first azimuth data, said second azimuth data, or a combination of said first and second azimuth data, based on the determination of said analyzing step, wherein said analyzing step comprises the sub-steps of:
acquiring said first and second azimuth data over a plurality of sampling periods within a time window,
performing a statistical analysis on said first and second azimuth data for said sampling periods, and
identifying a magnetic field disturbance on the basis of said statistical analysis, and
wherein said azimuth determining step comprises basing the determined azimuth, in a situation in which a magnetic disturbance is determined to be present, on one of:
i) said second azimuth data without reference to the first azimuth data, or
ii) a combination of said second azimuth data and said first azimuth data.

2. A method according to claim 1, wherein said first azimuth data source comprises at least one magnetic wherein said second azimuth data source comprises at least one gyroscope, said gyroscope being updatable with at least one of:

a gyroscope scale factor,
a gyroscope azimuth reference,
a gyroscope bias.

3. A method of determining an azimuth according to claim 1, further comprising the step of using said determined azimuth as a source of azimuth data for autonomous navigation.

4. A method of determining an azimuth using a first azimuth data source responsive to a magnetic field to deliver first azimuth data, and a second azimuth data source delivering, independent of magnetic field, second azimuth data comprising the steps of:

analyzing said first and second azimuth data to determine whether a magnetic disturbance is present, and
determining said azimuth selectively on the basis of: said first azimuth data, said second azimuth data, or a combination of said first and second azimuth data, based on the determination of said analyzing step, wherein said analyzing step comprises the sub-steps of:
acquiring said first and second azimuth data over a plurality of sampling periods within a time window,
determining the normal standard deviation of said first azimuth data and the normal standard deviation of said second azimuth data for said sampling periods, determining the ratio of said normal standard deviation of said first azimuth data to said normal standard deviation of said second azimuth data for said sampling periods, comparing said ratio to a determined threshold value, and identifying a magnetic field disturbance in a situation in which said ratio crosses said determined threshold, wherein said azimuth determining step comprises basing the determined azimuth, in a situation in which a magnetic disturbance is determined to be present, on one of:
- i) said second azimuth data without reference to the first azimuth data, or
- ii) a combination of said second azimuth data and said first azimuth data.

5. A method according to claim 4, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

6. A method of determining an azimuth according to claim 4, further comprising the step of using said determined azimuth as a source of azimuth data for autonomous navigation.

7. A method of determining an azimuth using a first azimuth data source responsive to a magnetic field to deliver first azimuth data, and a second azimuth data source delivering, independent of magnetic field, second azimuth data comprising the steps of:
analyzing said first and second azimuth data to determine whether a magnetic disturbance is present, and
determining said azimuth selectively on the basis of: said first azimuth data,
said second azimuth data, or a combination of said first and second azimuth data, based on the determination of said analyzing step, wherein said analyzing step comprises the sub-steps of:
acquiring said first and second azimuth data over a plurality of sampling periods within a determined time window, for a succession of time windows,
performing an analysis on first and second azimuth data for said sampling periods of at least a current time window and its preceding time window,
taking at least one of the following actions on the basis of said analysis:
- i) using only said first azimuth data of a current window to determine said azimuth,
- ii) using only said second azimuth data of a current window to determine said azimuth,
- iii) using a combination of said first azimuth data and said second azimuth of a current time window to determine said azimuth,
- iv) identifying a type path currently followed, and
- v) updating at least one parameter of said second azimuth data source.

8. A method according to claim 7, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

9. A method of determining an azimuth according to claim 7, further comprising the step of using said determined azimuth as a source of azimuth data for autonomous navigation.

10. A method of determining an azimuth using a first azimuth data source responsive to a magnetic field to deliver first azimuth data, and a second azimuth data source delivering, independent of magnetic field, second azimuth data comprising the steps of:
analyzing said first and second azimuth data to determine whether a magnetic disturbance is present, and
determining said azimuth selectively on the basis of: said first azimuth data, said second azimuth data, or a combination of said first and second azimuth data, based on the determination of said analyzing step, wherein said analyzing step comprises the sub-steps of:
acquiring said first and second azimuth data for a succession of time windows,
for at least some time windows of said succession, recording events occurring within a said time window, to obtain a sequence history of azimuth events over successive time windows, and
using said sequence history as input to optimize the determination of said azimuth and/or a determination of a position and/or a trajectory.

11. A method according to claim 10, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

12. A method of determining an azimuth according to claim 10, further comprising the step of using said determined azimuth as a source of azimuth data for autonomous navigation.

13. A method of determining an azimuth using a first azimuth data source responsive to a magnetic field to deliver first azimuth data, and a second azimuth data source delivering, independent of magnetic field, second azimuth data comprising the steps of:
analyzing said first and second azimuth data to determine whether a magnetic disturbance is present, and
determining said azimuth selectively on the basis of: said first azimuth data, said second azimuth data, or a combination of said first and second azimuth data, based on the determination of said analyzing step, wherein said analyzing step comprises the sub-steps of:
acquiring said first and second azimuth data for a succession of time windows,
for at least some time windows of said succession, recording events occurring within a said time window, said events comprising at least one of:
- i) choice of source(s) of azimuth data used for determining azimuth data,
- ii) sensor update or recalibration,
- iii) identified trajectory type,
- iv) presence of a magnetic field disturbance, to obtain a sequence history of azimuth events over successive time windows, and
using said sequence history as input to optimize the determination of said azimuth and/or a determination of a position and/or a trajectory.

14. A method according to claim 13, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

15. A method of determining an azimuth according to claim 13, further comprising the step of using said determined azimuth as a source of azimuth data for autonomous navigation.

16. A method of determining an azimuth using a first azimuth data source responsive to a magnetic field to deliver first azimuth data, and a second azimuth data source delivering, independent of magnetic field, second azimuth data comprising the steps of:
analyzing said first and second azimuth data to determine whether a magnetic disturbance is present, and
determining said azimuth selectively on the basis of: said first azimuth data, said second azimuth data, or a combination of said first and second azimuth data, based on the determination of said analyzing step, wherein said analyzing step comprises acquiring said first and second azimuth data over a plurality of sampling periods within a determined time window, and performing said acquisition for a succession of time windows.

17. A method according to claim 16, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

18. A method of determining an azimuth according to claim 16, further comprising the step of using said determined azimuth as a source of azimuth data for autonomous navigation.

19. A method of determining an azimuth using a first azimuth data source responsive to a magnetic field to deliver first azimuth data, and a second azimuth data source delivering, independent of magnetic field, second azimuth data comprising the steps of:
analyzing said first and second azimuth data to determine whether a magnetic disturbance is present, and
determining said azimuth selectively on the basis of: said first azimuth data,
said second azimuth data, or a combination of said first and second azimuth data, based on the determination of said analyzing step, wherein said analyzing step further comprises the steps of:
acquiring said first and second azimuth data over a plurality of sampling periods within a time window,
analyzing said first and second azimuth data of that time window,
on the basis of said analysis, performing at least one of
i) updating or recomputing at least one azimuth data of said time window, and
ii) updating or recomputing a present real-time azimuth.

20. A method according to claim 19, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

21. A method of determining an azimuth according to claim 19, further comprising the step of using said determined azimuth as a source of azimuth data for autonomous navigation.

22. A method of determining an azimuth using a first azimuth data source responsive to a magnetic field to deliver first azimuth data, and a second azimuth data source delivering, independent of magnetic field, second azimuth data comprising the steps of:
analyzing said first and second azimuth data to determine whether a magnetic disturbance is present, and
determining said azimuth selectively on the basis of: said first azimuth data,
said second azimuth data, or a combination of said first and second azimuth data, based on the determination of said analyzing step, wherein said analyzing step comprises the sub-steps of:
acquiring said first and second azimuth data over a plurality of sampling periods within a time window,
determining a position on the basis of said data,
analyzing said first and second azimuth data of that time window,
on the basis of said analyzing step, performing at least one of:
i) recomputing at least one determined position in said time window, and
ii) updating or recomputing a present real-time position.

23. A method according to claim 22, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

24. A method of determining an azimuth according to claim 22, further comprising the step of using said determined azimuth as a source of azimuth data for autonomous navigation.

25. A method of determining an azimuth using a first azimuth data source responsive to a magnetic field to deliver first azimuth data, and a second azimuth data source delivering, independent of magnetic field, second azimuth data comprising the steps of:
analyzing said first and second azimuth data to determine whether a magnetic disturbance is present, and
determining said azimuth selectively on the basis of: said first azimuth data, said second azimuth data, or a combination of said first and second azimuth data, based on the determination of said analyzing step, further comprising the steps of:
determining, on the basis of said analyzing step, a first condition in which no substantial magnetic field is present,
enabling an update of said second azimuth data source, on the basis of said first azimuth data from said first azimuth data source, only if said first condition is satisfied.

26. A method according to claim 25, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

27. A method of determining an azimuth according to claim 25, further comprising the step of using said determined azimuth as a source of azimuth data for autonomous navigation.

28. A method of determining an azimuth using a first azimuth data source responsive to a magnetic field to deliver first azimuth data, and a second azimuth data source delivering, independent of magnetic field, second azimuth data comprising the steps of:

analyzing said first and second azimuth data to determine whether a magnetic disturbance is present, and determining said azimuth selectively on the basis of: said first azimuth data, said second azimuth data, or a combination of said first and second azimuth data, based on the determination of said analyzing step, further comprising the steps of:

determining a current trajectory in terms of an amount of change in azimuth, using said determined current trajectory as a parameter for commanding a management of said first and/or second azimuth data source(s) and/or as a parameter for said analyzing step and/or said determining step.

29. A method according to claim 28, wherein said first azimuth data source comprises at least one magnetic wherein said second azimuth data source comprises at least one gyroscope, said gyroscope being updatable with at least one of:

a gyroscope scale factor, a gyroscope azimuth reference, a gyroscope bias.

30. A method of determining an azimuth according to claim 28, further comprising the step of using said determined azimuth as a source of azimuth data for autonomous navigation.

31. A method of determining an azimuth using a first azimuth data source responsive to a magnetic field to deliver first azimuth data, and a second azimuth data source delivering, independent of magnetic field, second azimuth data comprising the steps of:

analyzing said first and second azimuth data to determine whether a magnetic disturbance is present, and determining said azimuth selectively on the basis of: said first azimuth data, said second azimuth data, or a combination of said first and second azimuth data, based on the determination of said analyzing step, further comprising the steps of:

determining a current trajectory in terms of an amount of change in azimuth, identifying a current trajectory following a specific change of direction, notably a 90° or 180° change of direction, using said identified specific change of direction as a parameter for commanding a management of said first and/or second azimuth data source(s) and/or as a parameter for said analyzing step and/or said determining step.

32. A method according to claim 31, wherein said first azimuth data source comprises at least one magnetic wherein said second azimuth data source comprises at least one gyroscope, said gyroscope being updatable with at least one of:

a gyroscope scale factor, a gyroscope azimuth reference, a gyroscope bias.

33. A method of determining an azimuth according to claim 31, further comprising the step of using said determined azimuth as a source of azimuth data for autonomous navigation.

34. A method of determining an azimuth using a first azimuth data source responsive to a magnetic field to deliver first azimuth data, and a second azimuth data source delivering, independent of magnetic field, second azimuth data comprising the steps of:

analyzing said first and second azimuth data to determine whether a magnetic disturbance is present, and determining said azimuth selectively on the basis of: said first azimuth data, said second azimuth data, or a combination of said first and second azimuth data, based on the determination of said analyzing step, further comprising the steps of:

determining a current trajectory in terms of an amount of change in azimuth, identifying a current trajectory following a substantially straight line direction, corresponding to substantially no change in azimuth using said identified substantially straight line direction as a parameter for commanding a management of said first and/or second azimuth data source(s) and/or as a parameter for said analyzing step and/or said determining step.

35. A method according to claim 34, wherein said first azimuth data source comprises at least one magnetic wherein said second azimuth data source comprises at least one gyroscope, said gyroscope being updatable with at least one of:

a gyroscope scale factor, a gyroscope azimuth reference, a gyroscope bias.

36. A method of determining an azimuth according to claim 34, further comprising the step of using said determined azimuth as a source of azimuth data for autonomous navigation.

37. A method of determining an azimuth using a first azimuth data source responsive to a magnetic field to deliver first azimuth data, and a second azimuth data source delivering, independent of magnetic field, second azimuth data comprising the steps of:

analyzing said first and second azimuth data to determine whether a magnetic disturbance is present, and determining said azimuth selectively on the basis of: said first azimuth data, said second azimuth data, or a combination of said first and second azimuth data, based on the determination of said analyzing step, further comprising the steps of:

performing said azimuth determination over at least two successive determined time windows, for each successive time window, determining whether a trajectory follows a substantially straight line direction, determining whether a trajectory for a current time window and for a previous time window both follow a substantially straight line direction, in the affirmative, using trajectory data of said previous window and said current window to establish a continuity relation in which said trajectory is considered to follow a same substantially straight line.

38. A method according to claim 37, wherein said first azimuth data source comprises at least one magnetic wherein said second azimuth data source comprises at least one gyroscope, said gyroscope being updatable with at least one of:

a gyroscope scale factor, a gyroscope azimuth reference, a gyroscope bias.

39. A method of determining an azimuth according to claim 37, further comprising the step of using said determined azimuth as a source of azimuth data for autonomous navigation.

40. A method of determining an azimuth using a first azimuth data source responsive to a magnetic field to deliver first azimuth data, and a second azimuth data source delivering, independent of magnetic field, second azimuth data comprising the steps of:

analyzing said first and second azimuth data to determine whether a magnetic disturbance is present, and determining said azimuth selectively on the basis of: said first azimuth data, said second azimuth data, or a combination of said first and second azimuth data, based on the determination of said analyzing step, further comprising the steps of:

producing a history sequence of past events up to a current time, said history sequence expressing at least a magnetic field characteristic determined over a respective time window, said magnetic field characteristic being classed as one of:
i) a magnetically stable environment,
ii) a magnetically disturbed environment,
iii) a potentially magnetically disturbed environment, and wherein said azimuth determining step comprises using at least one said determined magnetic field characteristic as a parameter to determine said azimuth.

41. A method according to claim 40, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

42. A method of determining an azimuth according to claim 40, further comprising the step of using said determined azimuth as a source of azimuth data for autonomous navigation.

43. A method of determining an azimuth using a first azimuth data source responsive to a magnetic field to deliver first azimuth data, and a second azimuth data source delivering, independent of magnetic field, second azimuth data comprising the steps of:

analyzing said first and second azimuth data to determine whether a magnetic disturbance is present, and determining said azimuth selectively on the basis of: said first azimuth data, said second azimuth data, or a combination of said first and second azimuth data, based on the determination of said analyzing step, further comprising the steps of:

producing a history sequence of past events up to a current time, said history sequence expressing at least an azimuth or trajectory characteristic determined over a respective time window, said azimuth or trajectory characteristic being classed as one of:
i) a displacement substantially along a straight line,
ii) a displacement along a curve with a significant substantial continuous change in azimuth,
iii) a general situation not corresponding to listed situations i) or ii), and wherein said determining step comprises using at least one said determined azimuth or trajectory characteristic as a parameter to determine said azimuth.

44. A method according to claim 43, wherein said first azimuth data source comprises at least one magnetic wherein said second azimuth data source comprises at least one gyroscope, said gyroscope being updatable with at least one of:
a gyroscope scale factor,
a gyroscope azimuth reference,
a gyroscope bias.

45. A method of determining an azimuth according to claim 43, further comprising the step of using said determined azimuth as a source of azimuth data for autonomous navigation.

46. An apparatus for determining an azimuth, said apparatus comprising:

a first azimuth data source responsive to a magnetic field to deliver first azimuth data, a second azimuth data source delivering second azimuth data independent of magnetic field, means for analyzing said first and second azimuth data to determine whether a magnetic disturbance is present, and means for determining said azimuth selectively on the basis of: said first azimuth data, said second azimuth data, or a combination of said first and second azimuth data based on the determination of an analysis by said analyzing means, wherein said analyzing means comprises:

means for acquiring said first and second azimuth data over a plurality of sampling periods within a time window, means for performing a statistical analysis on said first and second azimuth data for said sampling periods, and means for identifying a magnetic field disturbance on the basis of said statistical analysis, and wherein said azimuth determining means comprises means for basing the determined azimuth on one of:
i) said second azimuth data alone, or
ii) a combination of said second azimuth data and said first azimuth data, when a magnetic disturbance is identified.

47. Apparatus according to claim 46, wherein said first azimuth data source comprises at least one magnetic compass, wherein said second azimuth data source comprises at least one gyroscope, said gyroscope being updatable with at least one of:
a gyroscope scale factor,
a gyroscope azimuth reference,
a gyroscope bias.

48. An apparatus for determining an azimuth according to claim 46 for use in an autonomous navigation application.

49. An apparatus for determining an azimuth, said apparatus comprising:

a first azimuth data source responsive to a magnetic field to deliver first azimuth data, a second azimuth data source delivering second azimuth data independent of magnetic field, means for analyzing said first and second azimuth data to determine whether a magnetic disturbance is present, and means for determining said azimuth selectively on the basis of: said first azimuth data, said second azimuth data, or a combination of said first and second azimuth data based on the determination of an analysis by said analyzing means, wherein said analyzing means comprises:

means for acquiring said first and second azimuth data over a plurality of sampling windows within a time window, means for determining the normal standard deviation of said first azimuth data and the normal standard deviation of said second azimuth data for said sampling periods, means for determining the ratio of said normal standard deviation of said first azimuth data to the normal standard deviation of said second azimuth data for said sampling periods, means for comparing said ratio to a determined threshold value, and means for identifying a magnetic field disturbance when said ratio crosses said determined threshold, and
wherein said azimuth determining means comprises means for basing the determined azimuth on one of:
i) said second azimuth data alone, or
ii) a combination of said second azimuth data and said first azimuth data, when a magnetic disturbance is identified.

50. Apparatus according to claim 49, wherein said first azimuth data source comprises at least one magnetic compass, wherein said second azimuth data source comprises at least one gyroscope, said gyroscope being updatable with at least one of:
a gyroscope scale factor,
a gyroscope azimuth reference,
a gyroscope bias.

51. An apparatus for determining an azimuth according to claim 49 for use in an autonomous navigation application.

52. An apparatus for determining an azimuth, said apparatus comprising:
a first azimuth data source responsive to a magnetic field to deliver first azimuth data,
a second azimuth data source delivering second azimuth data independent of magnetic field,
means for analyzing said first and second azimuth data to determine whether a magnetic disturbance is present, and
means for determining said azimuth selectively on the basis of: said first azimuth data, said second azimuth data, or a combination of said first and second azimuth data based on the determination of an analysis by said analyzing means, where said analyzing means comprises:
means for acquiring said first and second azimuth data over a plurality of sampling periods within a determined time window, and for performing said acquisition for a succession of time windows,
means for performing an analysis on first and second azimuth data for said sampling periods of at least a current time window and its preceding time window,
means for taking at least one of the following actions on the basis of said analysis:
i) using only said first azimuth data of a current window to determine said azimuth,
ii) using only said second azimuth data of a current window to determine said azimuth,
iii) using a combination of said first azimuth data and said second azimuth of a current time window to determine said azimuth,
iv) identifying a type path currently followed, and
v) updating at least one parameter of said second azimuth data source.

53. Apparatus according to claim 52, wherein said first azimuth data source comprises at least one magnetic compass, wherein said second azimuth data source comprises at least one gyroscope, said gyroscope being updatable with at least one of:
a gyroscope scale factor,
a gyroscope azimuth reference,
a gyroscope bias.

54. An apparatus for determining an azimuth according to claim 52 for use in an autonomous navigation application.

55. An apparatus for determining an azimuth, said apparatus comprising:
a first azimuth data source responsive to a magnetic field to deliver first azimuth data,
a second azimuth data source delivering second azimuth data independent of magnetic field,
means for analyzing said first and second azimuth data to determine whether a magnetic disturbance is present, and
means for determining said azimuth selectively on the basis of: said first azimuth data, said second azimuth data, or a combination of said first and second azimuth data based on the determination of an analysis by said analyzing means, wherein said analyzing means comprises:
means for acquiring said first and second azimuth data for a succession of time windows,
means for recording events occurring within a said time window, for at least some time windows of said succession, to obtain a sequence history of azimuth events over successive time windows, and
means for receiving said sequence history as input to optimize a determination of said azimuth and/or a determination of a position and/or a trajectory.

56. Apparatus according to claim 55, wherein said first azimuth data source comprises at least one magnetic compass, wherein said second azimuth data source comprises at least one gyroscope, said gyroscope being updatable with at least one of:
a gyroscope scale factor,
a gyroscope azimuth reference,
a gyroscope bias.

57. An apparatus for determining an azimuth according to claim 55 for use in an autonomous navigation application.

58. An apparatus for determining an azimuth, said apparatus comprising:
a first azimuth data source responsive to a magnetic field to deliver first azimuth data,
a second azimuth data source delivering second azimuth data independent of magnetic field,
means for analyzing said first and second azimuth data to determine whether a magnetic disturbance is present, and
means for determining said azimuth selectively on the basis of: said first azimuth data, said second azimuth data, or a combination of said first and second azimuth data based on the determination of an analysis by said analyzing means, wherein said analyzing means comprises:
means for acquiring said first and second azimuth data for a succession of time windows,
means for recording events occurring within a said time window, for at least some time windows of said succession, said events comprising at least one of:
i) choice of source(s) of azimuth data used for determining azimuth data,
ii) sensor update or recalibration,
iii) identified trajectory type,
iv) presence of a magnetic field disturbance,
to obtain a sequence history of azimuth events over successive time windows, and
means for receiving said sequence history as input to optimize a determination of said azimuth and/or a determination of a position and/or a trajectory.

59. Apparatus according to claim 58, wherein said first azimuth data source comprises at least one magnetic compass, wherein said second azimuth data source comprises at least one gyroscope, said gyroscope being updatable with at least one of:

a gyroscope scale factor,
a gyroscope azimuth reference,
a gyroscope bias.

60. An apparatus for determining an azimuth according to claim 58 for use in an autonomous navigation application.

61. An apparatus for determining an azimuth, said apparatus comprising:
    a first azimuth data source responsive to a magnetic field to deliver first azimuth data,
    a second azimuth data source delivering second azimuth data independent of magnetic field,
    means for analyzing said first and second azimuth data to determine whether a magnetic disturbance is present, and
    means for determining said azimuth selectively on the basis of: said first azimuth data, said second azimuth data, or a combination of said first and second azimuth data based on the determination of an analysis by said analyzing means, wherein said analyzing means comprises means for acquiring first and second azimuth data samples at successive time intervals within a determined time window, and for performing said acquisition for a succession of time windows.

62. Apparatus according to claim 61, wherein said first azimuth data source comprises at least one magnetic compass, wherein said second azimuth data source comprises at least one gyroscope, said gyroscope being updatable with at least one of:
    a gyroscope scale factor,
    a gyroscope azimuth reference,
    a gyroscope bias.

63. An apparatus for determining an azimuth according to claim 58 for use in an autonomous navigation application.

64. An apparatus for determining an azimuth, said apparatus comprising:
    a first azimuth data source responsive to a magnetic field to deliver first azimuth data,
    a second azimuth data source delivering second azimuth data independent of magnetic field,
    means for analyzing said first and second azimuth data to determine whether a magnetic disturbance is present, and
    means for determining said azimuth selectively on the basis of: said first azimuth data, said second azimuth data, or a combination of said first and second azimuth data based on the determination of an analysis by said analyzing means, wherein said analyzing means further comprises:
    means for acquiring said first and second azimuth data over a plurality of sampling periods within a time window,
        means for analyzing said first and second azimuth data of that time window, and
        means, cooperating with said analyzing means, for performing at least one of:
            i) updating or recomputing at least one azimuth data of said time window, and
            ii) updating or recomputing a present real-time azimuth.

65. Apparatus according to claim 64, wherein said first azimuth data source comprises at least one magnetic compass, wherein said second azimuth data source comprises at least one gyroscope, said gyroscope being updatable with at least one of:
    a gyroscope scale factor,
    a gyroscope azimuth reference,
    a gyroscope bias.

66. An apparatus for determining an azimuth according to claim 64 for use in an autonomous navigation application.

67. An apparatus for determining an azimuth, said apparatus comprising:
    a first azimuth data source responsive to a magnetic field to deliver first azimuth data,
    a second azimuth data source delivering second azimuth data independent of magnetic field,
    means for analyzing said first and second azimuth data to determine whether a magnetic disturbance is present, and
    means for determining said azimuth selectively on the basis of: said first azimuth data, said second azimuth data, or a combination of said first and second azimuth data based on the determination of an analysis by said analyzing means, wherein said analyzing means further comprises:
        means for acquiring said first and second azimuth data over a plurality of sampling periods within a time window,
        means for determining a position on the basis of said data,
        means for analyzing said first and second azimuth data of that time window,
        means, cooperating with said analyzing means, for performing at least one of:
            i) recomputing at least one said determined position in said time window, and
            ii) updating or recomputing a present real-time position.

68. Apparatus according to claim 67, wherein said first azimuth data source comprises at least one magnetic compass, wherein said second azimuth data source comprises at least one gyroscope, said gyroscope being updatable with at least one of:
    a gyroscope scale factor,
    a gyroscope azimuth reference,
    a gyroscope bias.

69. An apparatus for determining an azimuth according to claim 67 for use in an autonomous navigation application.

70. An apparatus for determining an azimuth, said apparatus comprising:
    a first azimuth data source responsive to a magnetic field to deliver first azimuth data,
    a second azimuth data source delivering second azimuth data independent of magnetic field,
    means for analyzing said first and second azimuth data to determine whether a magnetic disturbance is present, and
    means for determining said azimuth selectively on the basis of: said first azimuth data, said second azimuth data, or a combination of said first and second azimuth data based on the determination of an analysis by said analyzing means, further comprising:
        means for determining, on the basis of analysis data from said analyzing means, a first condition in which no substantial magnetic disturbance is present, and
        means for enabling an update of said second azimuth data source, on the basis of said first azimuth data from said first azimuth data source, only if said first condition is satisfied.

71. Apparatus according to claim 70, wherein said first azimuth data source comprises at least one magnetic compass, wherein said second azimuth data source comprises at least one gyroscope, said gyroscope being updatable with at least one of:

a gyroscope scale factor,
a gyroscope azimuth reference,
a gyroscope bias.

72. An apparatus for determining an azimuth according to claim 70 for use in an autonomous navigation application.

73. An apparatus for determining an azimuth, said apparatus comprising:
a first azimuth data source responsive to a magnetic field to deliver first azimuth data,
a second azimuth data source delivering second azimuth data independent of magnetic field,
means for analyzing said first and second azimuth data to determine whether a magnetic disturbance is present, and
means for determining said azimuth selectively on the basis of: said first azimuth data, said second azimuth data, or a combination of said first and second azimuth data based on the determination of an analysis by said analyzing means, further comprising:
means for determining a current trajectory in terms of an amount of change in azimuth,
means for commanding a management of said first and/or second azimuth data source(s) and/or said analyzing means and/or said determining means on the basis of said determined current trajectory as a parameter for determining an azimuth.

74. Apparatus according to claim 73, wherein said first azimuth data source comprises at least one magnetic compass, wherein said second azimuth data source comprises at least one gyroscope, said gyroscope being updatable with at least one of:
a gyroscope scale factor,
a gyroscope azimuth reference,
a gyroscope bias.

75. An apparatus for determining an azimuth according to claim 73 for use in an autonomous navigation application.

76. An apparatus for determining an azimuth, said apparatus comprising:
a first azimuth data source responsive to a magnetic field to deliver first azimuth data,
a second azimuth data source delivering second azimuth data independent of magnetic field,
means for analyzing said first and second azimuth data to determine whether a magnetic disturbance is present, and
means for determining said azimuth selectively on the basis of: said first azimuth data, said second azimuth data, or a combination of said first and second azimuth data based on the determination of an analysis by said analyzing means, further comprising:
means for determining a current trajectory in terms of an amount of change in azimuth,
means for identifying a current trajectory following a specific change of direction, notably a 90° or 180° change of direction,
means for commanding a management of said first and/or second azimuth data source(s) and/or said analyzing means and/or said determining means on the basis of said specific change of direction.

77. Apparatus according to claim 76, wherein said first azimuth data source comprises at least one magnetic compass, wherein said second azimuth data source comprises at least one gyroscope, said gyroscope being updatable with at least one of:
a gyroscope scale factor,
a gyroscope azimuth reference,
a gyroscope bias.

78. An apparatus for determining an azimuth according to claim 76 for use in an autonomous navigation application.

79. An apparatus for determining an azimuth, said apparatus comprising:
a first azimuth data source responsive to a magnetic field to deliver first azimuth data,
a second azimuth data source delivering second azimuth data independent of magnetic field,
means for analyzing said first and second azimuth data to determine whether a magnetic disturbance is present, and
means for determining said azimuth selectively on the basis of: said first azimuth data, said second azimuth data, or a combination of said first and second azimuth data based on the determination of an analysis by said analyzing means, further comprising:
means for determining a current trajectory in terms of an amount of change in azimuth,
means for identifying a current trajectory following a substantially straight line direction, corresponding to substantially no change in azimuth,
means for commanding a management of said first and/or second azimuth data source(s) and/or said analyzing means and/or said determining means on the basis of said identified substantially straight line direction.

80. Apparatus according to claim 79, wherein said first azimuth data source comprises at least one magnetic compass, wherein said second azimuth data source comprises at least one gyroscope, said gyroscope being updatable with at least one of:
a gyroscope scale factor,
a gyroscope azimuth reference,
a gyroscope bias.

81. An apparatus for determining an azimuth according to claim 79 for use in an autonomous navigation application.

82. An apparatus for determining an azimuth, said apparatus comprising:
a first azimuth data source responsive to a magnetic field to deliver first azimuth data,
a second azimuth data source delivering second azimuth data independent of magnetic field,
means for analyzing said first and second azimuth data to determine whether a magnetic disturbance is present, and
means for determining said azimuth selectively on the basis of: said first azimuth data, said second azimuth data, or a combination of said first and second azimuth data based on the determination of an analysis by said analyzing means, further comprising:
means for performing said azimuth determination over at least two successive determined time windows,
means, operative for each successive time window, for determining whether a trajectory follows a substantially straight line direction,
means for determining whether a trajectory for a current time window and for a previous time window both follow a substantially straight line direction, and, in the affirmative, operative for using trajectory data of said previous window and said current window to establish a continuity relation in which said trajectory is considered to follow a same substantially straight line.

83. Apparatus according to claim 82, wherein said first azimuth data source comprises at least one magnetic compass, wherein said second azimuth data source comprises at least one gyroscope, said gyroscope being updatable with at least one of:

a gyroscope scale factor, a gyroscope azimuth reference, a gyroscope bias.

84. An apparatus for determining an azimuth according to claim 82 for use in an autonomous navigation application.

85. An apparatus for determining an azimuth, said apparatus comprising:

- a first azimuth data source responsive to a magnetic field to deliver first azimuth data,
- a second azimuth data source delivering second azimuth data independent of magnetic field,
- means for analyzing said first and second azimuth data to determine whether a magnetic disturbance is present, and
- means for determining said azimuth selectively on the basis of: said first azimuth data, said second azimuth data, or a combination of said first and second azimuth data based on the determination of an analysis by said analyzing means, further comprising:
  - means for producing a history sequence of past events up to a current time, said history sequence expressing at least a magnetic field characteristic determined over a respective time window, said magnetic field characteristic being classed as one of:
    - i) a magnetically stable environment,
    - ii) a magnetically disturbed environment,
    - iii) a potentially magnetically disturbed environment, and
  - wherein said azimuth determining means comprises means using at least one said determined magnetic field characteristic as a parameter to determine said azimuth.

86. Apparatus according to claim 85, wherein said first azimuth data source comprises at least one magnetic compass, wherein said second azimuth data source comprises at least one gyroscope, said gyroscope being updatable with at least one of:

a gyroscope scale factor, a gyroscope azimuth reference, a gyroscope bias.

87. An apparatus for determining an azimuth according to claim 85 for use in an autonomous navigation application.

88. An apparatus for determining an azimuth, said apparatus comprising:

- a first azimuth data source responsive to a magnetic field to deliver first azimuth data,
- a second azimuth data source delivering second azimuth data independent of magnetic field,
- means for analyzing said first and second azimuth data to determine whether a magnetic disturbance is present, and
- means for determining said azimuth selectively on the basis of: said first
- azimuth data, said second azimuth data, or a combination of said first and second azimuth data based on the determination of an analysis by said analyzing means, further comprising:
  - means for producing a history sequence of past events up to a current time, said history sequence expressing at least an azimuth or trajectory characteristic determined over a respective time window, said azimuth or trajectory characteristic being classed as one of:
    - i) a displacement substantially along a straight line,
    - ii) a displacement along a curve with a significant substantial continuous change in azimuth,
    - iii) a general situation not corresponding to listed situations i) or ii), and
  - wherein said determining means comprises using at least one said determined azimuth or trajectory characteristic as a parameter to determine said azimuth.

89. Apparatus according to claim 88, wherein said first azimuth data source comprises at least one magnetic compass, wherein said second azimuth data source comprises at least one gyroscope, said gyroscope being updatable with at least one of:

a gyroscope scale factor, a gyroscope azimuth reference, a gyroscope bias.

90. An apparatus for determining an azimuth according to claim 88 for use in an autonomous navigation application.

* * * * *